(12) United States Patent
Page

(10) Patent No.: US 10,681,331 B2
(45) Date of Patent: Jun. 9, 2020

(54) SYSTEM AND METHOD FOR 3D SCANNING

(71) Applicant: MODit 3D, Inc., San Rafael, CA (US)

(72) Inventor: James S. Page, San Rafael, CA (US)

(73) Assignee: MODit 3D, Inc., San Rafael, CA (US)

( * ) Notice: Subject to any disclaimer, the term of this patent is extended or adjusted under 35 U.S.C. 154(b) by 0 days.

(21) Appl. No.: 15/890,292

(22) Filed: Feb. 6, 2018

(65) Prior Publication Data

US 2018/0227571 A1    Aug. 9, 2018

Related U.S. Application Data

(60) Provisional application No. 62/455,158, filed on Feb. 6, 2017.

(51) Int. Cl.
| | |
|---|---|
| *H04N 13/161* | (2018.01) |
| *H04N 5/225* | (2006.01) |
| *H04N 5/235* | (2006.01) |
| *H04N 13/388* | (2018.01) |
| *H04N 9/31* | (2006.01) |
| *H04N 13/246* | (2018.01) |
| *G06T 7/521* | (2017.01) |
| *G01B 11/25* | (2006.01) |
| *H04N 13/00* | (2018.01) |

(52) U.S. Cl.
CPC ....... *H04N 13/161* (2018.05); *G01B 11/2509* (2013.01); *G01B 11/2513* (2013.01); *G01B 11/2518* (2013.01); *G06T 7/521* (2017.01); *H04N 5/2256* (2013.01); *H04N 5/2351* (2013.01); *H04N 9/3182* (2013.01); *H04N 9/3194* (2013.01); *H04N 13/246* (2018.05); *H04N 13/388* (2018.05); *G06T 2207/10016* (2013.01); *G06T 2207/10024* (2013.01); *H04N 2013/0085* (2013.01)

(58) Field of Classification Search
None
See application file for complete search history.

(56) References Cited

U.S. PATENT DOCUMENTS

| 6,219,461 B1 * | 4/2001 | Wallack | G01B 11/22 |
| | | | 382/106 |
| 2007/0046924 A1 | 3/2007 | Chang | |
| 2008/0118143 A1 | 5/2008 | Gordon et al. | |

(Continued)

FOREIGN PATENT DOCUMENTS

| WO | 2012/124788 A1 | 9/2012 |
| WO | 2015134961 A1 | 9/2015 |

OTHER PUBLICATIONS

Salvi "Pattern Codification Strategies in Structured Light Systems", Apr. 2004, Pattern Recognition, vol. 37, Issue 4, pp. 827-849.*

(Continued)

*Primary Examiner* — Frederick D Bailey
(74) *Attorney, Agent, or Firm* — Loginov & Associates, PLLC; William A. Loginov

(57) ABSTRACT

Systems and/or methods for, for a given pixel (or sub-pixel location) in an image acquired by the camera, finding which projector pixel (or more particularly, which projector column) primarily projected the light that was reflected from the object being scanned back to this camera position (e.g. what projector coordinates or projector column coordinate correspond(s) to these camera coordinates).

18 Claims, 17 Drawing Sheets

(56) References Cited

U.S. PATENT DOCUMENTS

| | | | |
|---|---|---|---|
| 2009/0238449 A1* | 9/2009 | Zhang | G01B 11/2536 |
| | | | 382/165 |
| 2012/0177121 A1* | 7/2012 | Tripathi | G06T 7/20 |
| | | | 375/240.16 |
| 2013/0127854 A1 | 5/2013 | Shpunt et al. | |
| 2013/0156330 A1* | 6/2013 | Kane | G06K 9/00201 |
| | | | 382/218 |
| 2013/0335548 A1* | 12/2013 | Kim | G02B 21/14 |
| | | | 348/79 |
| 2014/0078260 A1 | 3/2014 | Taubin et al. | |
| 2014/0172377 A1 | 6/2014 | Taubin et al. | |
| 2014/0218476 A1* | 8/2014 | Bolter | G06T 15/503 |
| | | | 348/46 |
| 2014/0218477 A1 | 8/2014 | Pawelski | |
| 2015/0120260 A1 | 4/2015 | Taubin | |
| 2015/0187081 A1* | 7/2015 | Cho | G06T 7/521 |
| | | | 382/154 |
| 2015/0381946 A1* | 12/2015 | Renkis | G08B 13/19656 |
| | | | 348/47 |
| 2016/0094830 A1 | 3/2016 | Taubin et al. | |
| 2016/0335773 A1* | 11/2016 | Romano | G06T 15/50 |
| 2017/0287157 A1* | 10/2017 | Seto | G06T 7/60 |
| 2017/0372489 A1* | 12/2017 | Tabuchi | G06T 7/62 |
| 2018/0328724 A1* | 11/2018 | Matsuda | G01B 11/25 |

OTHER PUBLICATIONS

Moreno et al., "Embedded Phase Shifting: Robust Phase Shifting With Embedded Signals", 2015, pp. 2301-2309, Publisher: Computer Vision Foundation, Published in: USA.

Moreno et al., "Rapid Hand Shape Reconstruction With Chebyshev Phase Shifting", 2016, Publisher: 2016 Fourth International Conference on 3D Vision, Published in: USA.

\* cited by examiner

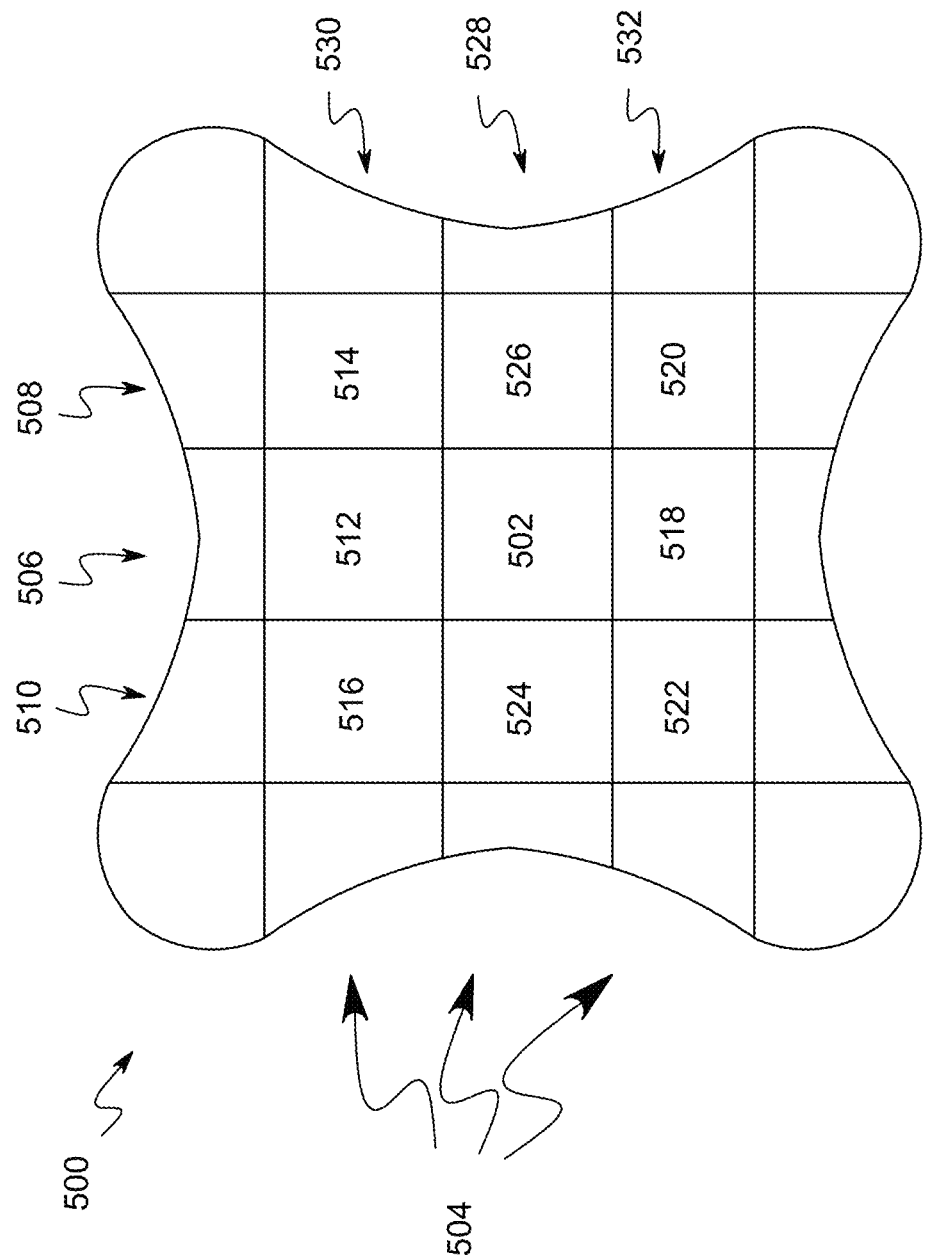

SYSTEM AND METHOD FOR 3D SCANNING

RELATED APPLICATION

This application claims the benefit of U.S. Provisional Application Ser. No. 62/455,158, filed Feb. 6, 2017, entitled SYSTEM AND METHOD FOR 3D SCANNING, the entire disclosure of which is herein incorporated by reference.

FIELD OF THE INVENTION

This invention relates to systems and methods for optical 3D scanning of objects and handling of 3D data and image data generated by such systems and methods.

BACKGROUND OF THE INVENTION

There is a growing need for high-accuracy, low-cost 3D scanning processes that can tolerate challenging conditions such as relative motion between scanner and scanned object, non-Lambertian materials and a variety of lighting conditions.

Structured Light (SL) techniques are the best current methods for accurate capture of 3 dimensional shapes. These are active techniques that illuminate objects or environments of interest with specially designed patterns of visible or invisible light. Images of the objects and/or environments are then captured with one or more cameras while the special patterns are illuminating the objects and/or environments. The 3D geometry is calculated from the images with triangulation using knowledge of relative angle, displacement and optical factors for the camera and projector. The active light source allows results to be relatively invariant to different material and environmental properties such as color, texture and ambient illumination. Modern light projection engines, image sensors and digital signal processing (DSP) device technology can project and capture high resolution images at high frame rate reliably and accurately.

The significant qualities of the results of structured light techniques are determined by the characteristics of the patterns (and usually the temporal sequence of patterns) that are projected onto the object or environment to be captured. The purpose of the patterns is to encode information that enables camera image coordinates to be directly related to projected image coordinates. Projected patterns typically encode the projector image column or row coordinates so that with the use of optical and geometric calibration information, it becomes possible to use optical triangulation to identify 3 dimensional (3D) space coordinates of the object being scanned which correspond to each pixel in the projector coordinate space or sometimes each pixel in the captured camera images.

Structured light patterns are typically classified according to whether they allow retrieval of 3D coordinates corresponding to discrete projector pixel locations or whether they allow sub-pixel (i.e. continuous) measurements. Continuous patterns may be able to find a different 3D coordinate for each camera pixel coordinate, or even camera sub-pixel coordinates, whereas, discrete patterns only identify positions corresponding to discrete projector pixel coordinates. Results from discrete techniques may only have as many 3D points as projector pixels, whereas 3D models resulting from conventional continuous techniques may have as many 3D points as camera pixels. See, e.g., D. Moreno, W. Y. Hwang and G. Taubin. Rapid Hand Shape Reconstruction with Chebyshev Phase Shifting. 2016 *Fourth International Conference on* 3*D Vision*. Results from advanced techniques presented here may have camera sub-pixel resolution meaning that they may have more 3D points than camera pixels.

Conventionally, continuous techniques require better control of projected colors and intensities as well as camera to projector color and intensity correspondence and calibration of colors and intensities is necessary. In contrast, discrete techniques may not require this level of control and calibration with the downside that they may be slower and yield lower resolution.

Many continuous techniques, generally known as Phase Shifting (PS) encode a projector axis (typically the X axis of the projected image) as sinusoidal grayscale or color patterns. PS techniques are more tolerant of projector defocus which is unavoidable when using large optical apertures typical in digital projectors.

Current PS 3D scanning techniques require capturing multiple images of an object or scene per static data set and generally make the assumption in their algorithms that the images are of the same scene from the same vantage point. Therefore they have a requirement of little relative motion between scanner and object or environment during the entire multiple-image capture duration for acquisition of each individual dataset. To a certain extent the limitations of relative motion can be overcome using higher and higher frame rates, but there are direct advantages to be had in 3 dimensional accuracy, data quality and quantity and color accuracy and mapping accuracy if the number of images to be captured per data set can be reduced, and especially reducing the required number of images to be captured under the influence of non-uniform illumination patterns.

SUMMARY OF THE INVENTION

The present invention overcomes the disadvantages of the prior art by providing systems and/or methods for, for a given pixel (or sub-pixel location) in an image acquired by the camera, finding which projector pixel (or more particularly, which projector column) primarily projected the light that was reflected from the object being scanned back to this camera position (e.g. what projector coordinates or projector column coordinate correspond(s) to these camera coordinates).

One aspect of the disclosure provides a system for capturing 3D representations from an object, comprising: a light source being configured to project a sequence of one or more light patterns, at least one of the light patterns is a phase-encoded pattern containing a non-repeating pattern of gradients between each pixel and adjacent pixels, whereby the light source can project the phase-encoded pattern onto a scene; a light sensor configured to capture at least one image of the scene under the influence of the projected pattern; and a processor configured to decode gradients in the captured image to determine the coordinates in the projected image that created the light received at each captured image pixel.

In one example, the non-repeating pattern has signs of the gradients between each pixel and adjacent pixels form a non-repeating pattern.

In one example, subsets of gradients between pixels and their adjacent pixels form more than one code per pixel that each can be decoded to yield phase values.

In one example, the gradients between pixels and their adjacent pixels are interpreted as binary or ternary numbers which are used as the basis of a phase-decoding process. In one example, pixel phase values are recorded as valid only if more than one code decodes to the same phase value.

In one example, a confidence score is calculated for the decoded phase value assigned to a captured image pixel based on the number of decoded codes that agree on the phase value.

Another aspect of the disclosure provides a method for capturing 3D representations from an object, comprising: projecting a sequence of one or more light patterns, at least one of the light patterns is a phase-encoded pattern containing a non-repeating pattern of gradients between each pixel and adjacent pixels, whereby the light source can project the phase-encoded pattern onto a scene; capturing at least one image of the scene under the influence of the projected pattern; and decoding gradients in the captured image to determine the coordinates in the projected image that created the light received at each captured image pixel.

In one example, the non-repeating pattern has signs of the gradients between each pixel and adjacent pixels form a non-repeating pattern.

In one example, subsets of gradients between pixels and their adjacent pixels form more than one code per pixel that each can be decoded to yield phase values.

In one example, the gradients between pixels and their adjacent pixels are interpreted as binary or ternary numbers which are used as the basis of a phase-decoding process.

In one example, pixel phase values are recorded as valid only if more than one code decodes to the same phase value.

In one example, a confidence score is calculated for the decoded phase value assigned to a captured image pixel based on the number of decoded codes that agree on the phase value.

Another aspect of the disclosure provides a method for generating a 3D dataset, comprising: projecting one or more phase images onto a scene or object; projecting one or more full-illumination images interleaved within the one or more phase images; capturing a first set of one or more images of the scene or object at times when the one or more phase images are projected; generating a 3D dataset from the first set of one or more images; capturing a second set of one or more images of the scene or object when the one or more full-illumination images are projected; calculating at least one motion parameter from the second set of one or more images.

In one example, the one or more phase images have a spatial frequency in the range of 1-200 periods per frame width.

In one example, the one or more phase images comprise a universal phase image.

In one example, the one or more full-illumination images are interleaved within the one or more phase images.

In one example, the motion parameter comprises at least one of a relative motion trajectory or an orientation difference.

In one example, capturing the first set of one or more images and capturing the first set of one or more images are captured at different frame rates.

BRIEF DESCRIPTION OF THE DRAWINGS

The invention description below refers to the accompanying drawings, of which:

FIG. 5A shows a partial image from a structured light scanning process;

FIG. 6A shows a schematic partial image from a structured light scanning process.

FIG. 6B shows a schematic partial image from a structured light scanning process;

FIG. 6C shows a schematic partial image from a structured light scanning process;

FIG. 6D shows a schematic partial image from a structured light scanning process;

FIG. 6E shows a schematic partial image from a structured light scanning process;

DETAILED DESCRIPTION

"Single Frame" Depth Mapping

Figure 1:
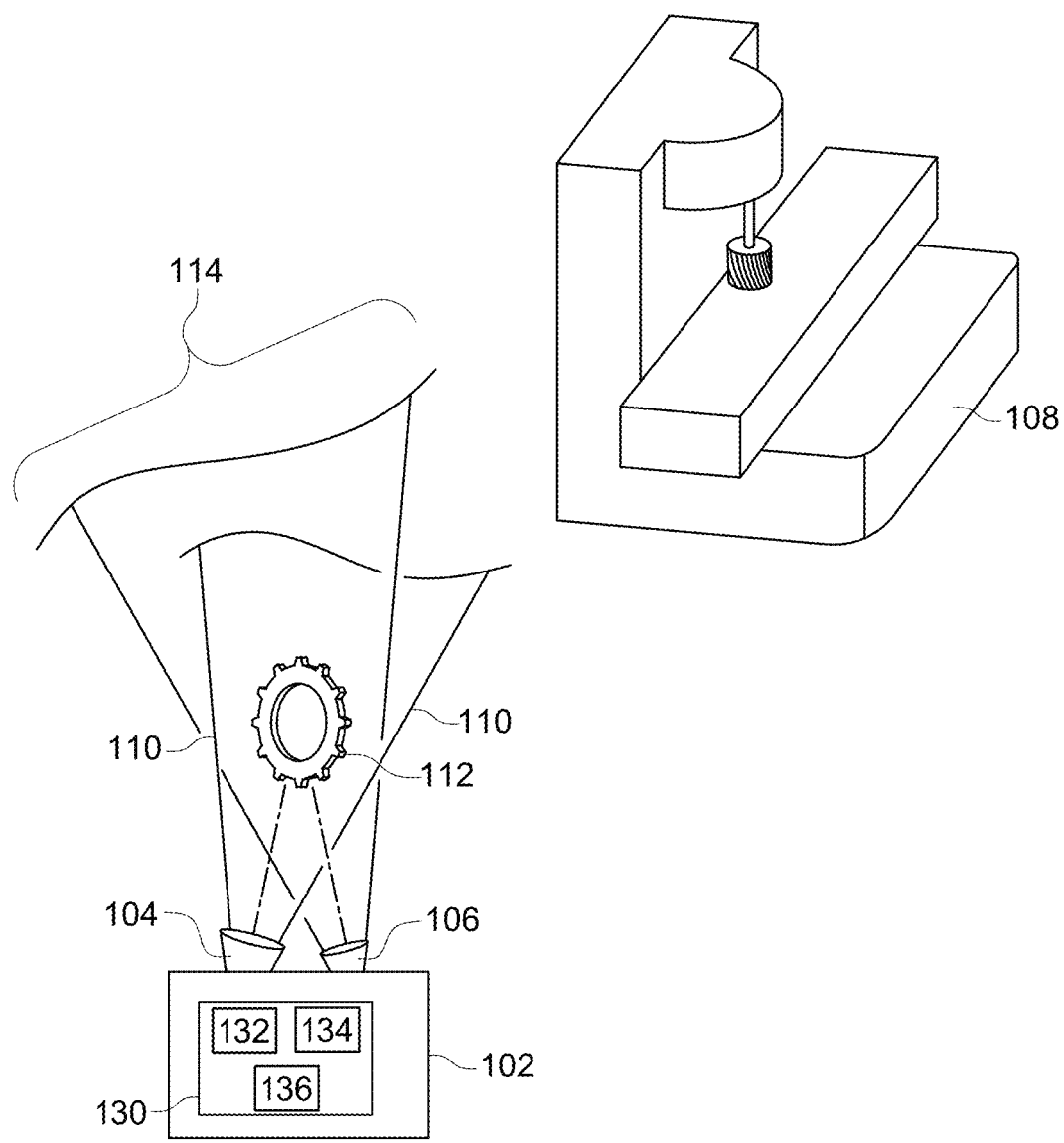
FIG. 1 shows a Phase Shift (PS) scanner device.

FIG. 1 shows a phase shift (PS) 3D scanner 102. Scanner 102 has a projector 104 and a sensor 106. The 3D scanner 102 (also referred to as a scanner) is a device which collects depth information about its surroundings or objects within its sensing range.

3D scanners typically use sensors and/or cameras to gather information about their environment. Some 3D scanners also encode their environment with light patterns using a light source or projector which may have pixels or discretely accessible coordinates within the image or light pattern they project. This encoding may make it possible to determine which projector coordinate created light that strikes a given location in the environment or on a particular object.

3D scanners typically use light sensors. These may be electronic sensors that detect light intensity and optionally color. Sensors may be charge-coupled-device (CCD) and complementary metal-oxide semiconductor (CMOS) devices or any other device that creates a signal that changes depending upon incident light. The signal is typically electronic, but may also be chemical or physical as in the case of conventional film.

For the purposes of this description, the term "sensor" or "light sensor" can be taken broadly to include a light-detecting element (CCD, CMOS, etc.) that resolves images into pixels having varying grayscale or color (e.g. red, green, blue or cyan, magnetic, yellow) intensity values and any associated optics—which can be a fixed or variable lens assembly defining an optical axis. The optical axis can be perpendicular to the image plane of the light-detecting element or oriented at a non-perpendicular angle thereto. The optics, when variable, can be based on a mechanical or liquid lens technology, among others and can include auto-focus circuitry implemented according to known or custom techniques.

In one example, a 3D scanner may be embodied as a camera. The camera can have a housing, one or more optical elements (e.g., lens, filter, etc.) for focusing or filtering light either embodied within the housing or exterior to the housing, with the sensor and processing circuitry housed within the housing. The camera may optionally include a display to provide a preview of a scene to be imaged.

3D scanners may use light sources (e.g., a light emitting module). One type of light source is a projector. Most projectors are able to modulate light that they emit in space and/or time. Many projectors are able to project pre-determined or dynamic images. Projectors may have a focal range or they may be focus-less (as in the case of laser-projectors). Projectors may use visible or invisible light or other wavelengths of electromagnetic radiation. Other types of light sources are also possible including light emitting diodes (LEDs), light emitting screens such as LCD, OLED, etc., and incandescent bulbs.

Resolution of image sensors and cameras is typically described in terms of pixel dimensions or total number of pixels (megapixels).

Resolution of 3D scan data is typically described in terms of its inverse, point spacing (e.g. 0.1 mm between points). A "resolution of X.XX mm" is often employed in the art, which is, technically, the point spacing. Sometimes a differentiation is made between the horizontal resolution and the depth resolution as these are typically different and are influenced by different factors within the same 3D scanning system.

The sensor 106 can be an overall camera assembly and/or another implementation of a charge-coupled device (CCD), complementary metal-oxide-semiconductor (CMOS), or other type of sensor arrangement. Projector 104 is configured to project appropriate structured light patterns (not shown) on an object being scanned 112. Projector 104 is configured to have a field of view (FOV) 110. FOV 110 is the angular and spatial region where light is projected. Scanning camera 106 may be configured to have a field of view (FOV) 114 that is narrow so that it captures high-resolution data from light reflected from object 112, or it may have a wide FOV to collect lower-resolution data about a larger area.

In some examples, the scanning device 102 can include one or more sensors 106 that can capture images at differing resolutions and/or fields of view (FOV) such that additional sensors may capture further information about the environment or other objects illuminated by the projector.

Sensor 106 can be any type of image sensor capable of capturing and imaging a scene, such as CMOS or CCD devices. The sensor 106 can be operatively connected to one or more processor assemblies 130, respectively, to process or operate on the data received by the sensor 106. In one example, the sensor 106 can be operatively connected to a single processor assembly, while in another example multiple sensors can be operatively connected to a separate, discrete processor assembly. The processor assembly 130 main processor 132, a graphics processing unit (GPU) 134, and a memory module 136 that may store instructions for executing any of the processes described herein, as well as any data relating to light patterns to be displayed by projector 104. The sensor 106, alone or in combination additional sensors, can collect 3D scan data and generate a 3D model of the object.

Figure 1A:
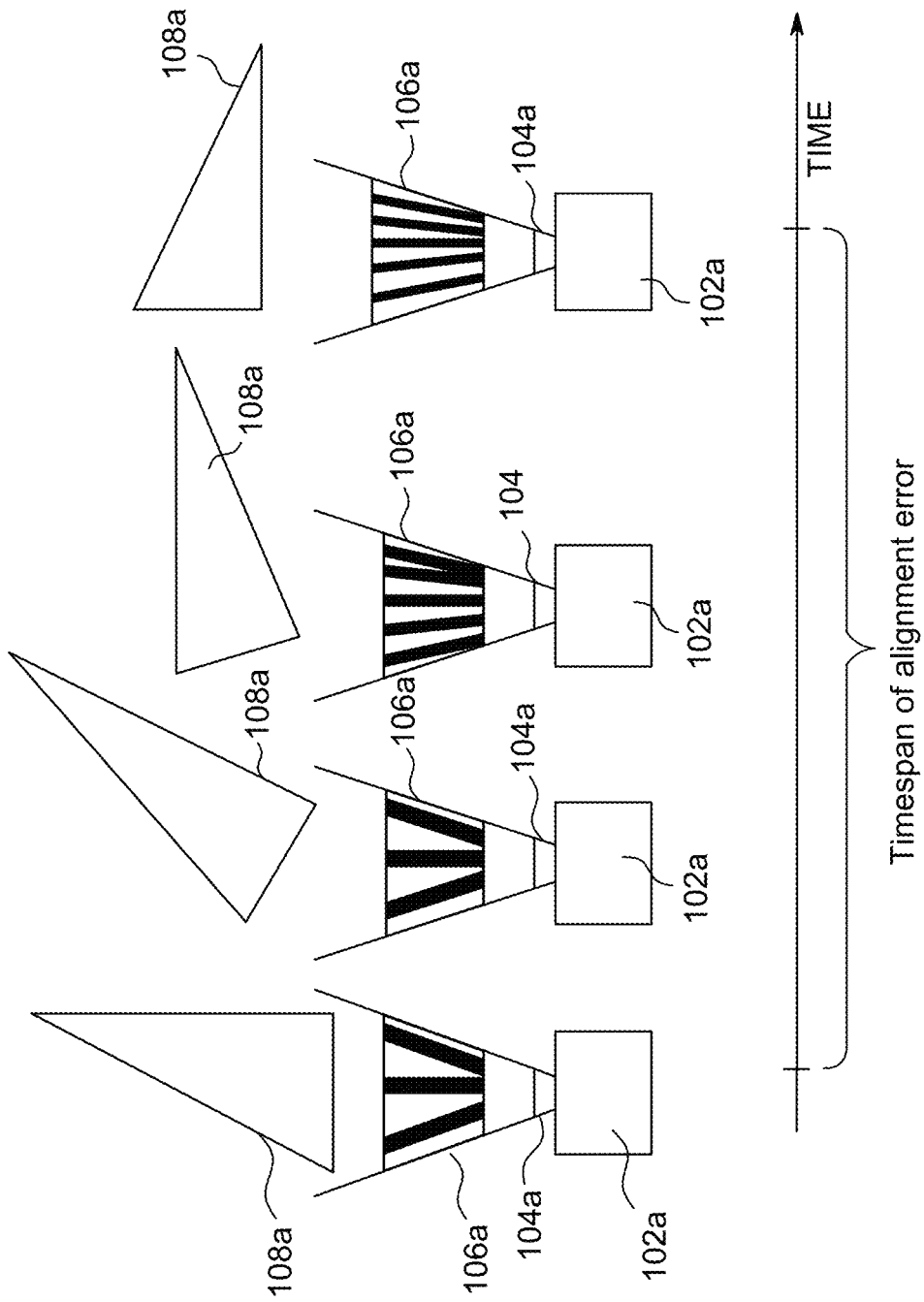
FIG. 1A shows a structured light scanning process with relative motion between a 3D scanner and an object.

FIG. 1A schematically shows a structured light scanning process of an object 108a using a scanning device 102a (such as scanning device 102 described above) having a projector 104a that emits structured light 106a. The same pixel-coordinate location of each projected image will land on different locations of an object to be scanned if it moves relative to the scanner during the scanning process.

Figure 2:
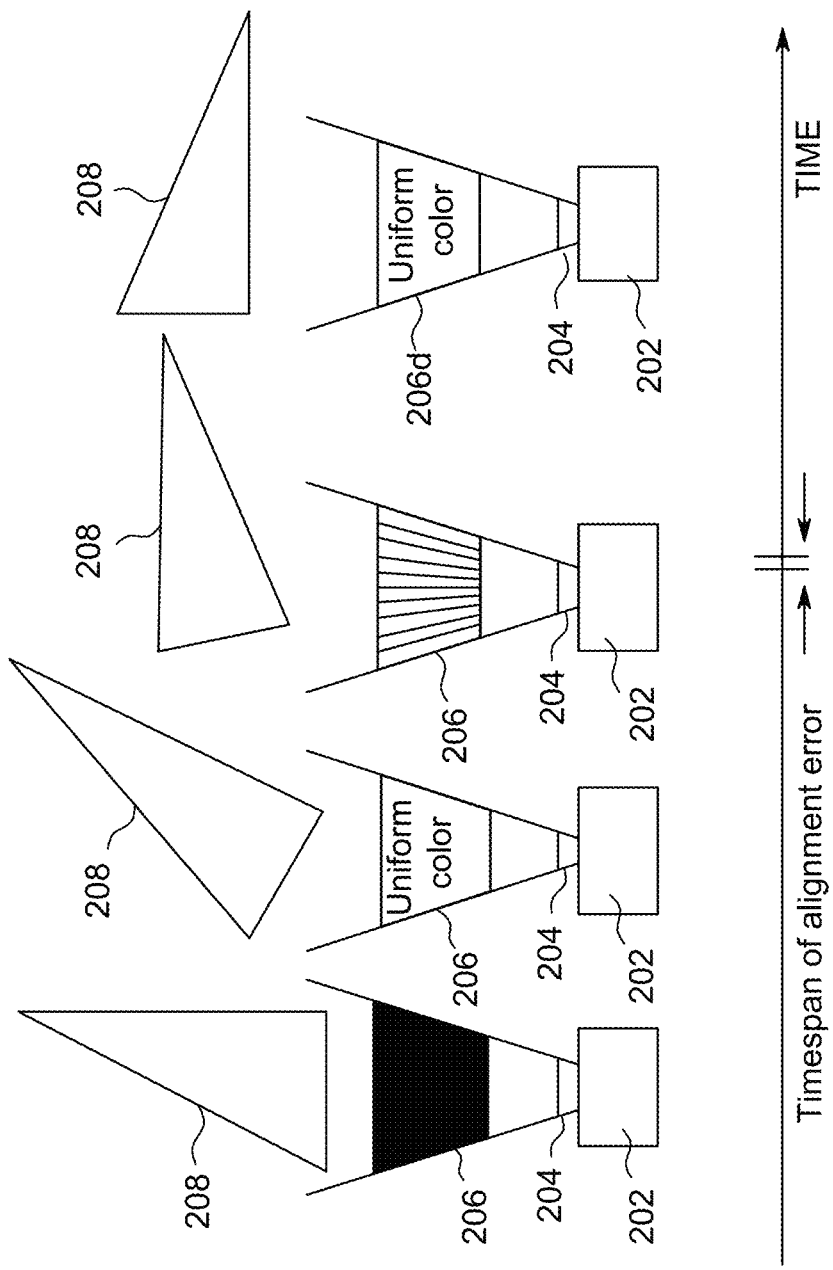
FIG. 2 shows a modified structured light scanning process.

FIG. 2 schematically shows a structured light scanning process where only one image has a pattern and the other solid-color images are motion invariant (e.g. the color and intensity of the light on a given location in the scene illuminated by the projected image does not change substantially even if there is relative motion between the scanner and the scene for locations that remain illuminated). In this example, scanning device 202 includes a projector 204 to project light onto object 208. As shown, the patterns and types of light can vary over time. At a first point in time, the light 206a can be a solid-color image, such as black. At a second point in time, the light 206b can be a uniform color (such as a uniform image of red, green, blue, cyan, magenta, yellow, etc.). At a third point in time, the light 206c can be a stripe pattern. In one example, the stripes may be continuous straight lines, while in other examples the stripes may be discontinuous. At a fourth point in time, the light 206d can be a second uniform color, which may or may not be different from the uniform color at the second point in time. The lights 206a, 206b, 206c, and 206d may be projected in any order. In some cases some of the projected light at the various points in time (especially solid-color images) may be projected more than once within a sequence).

Figure 3A:
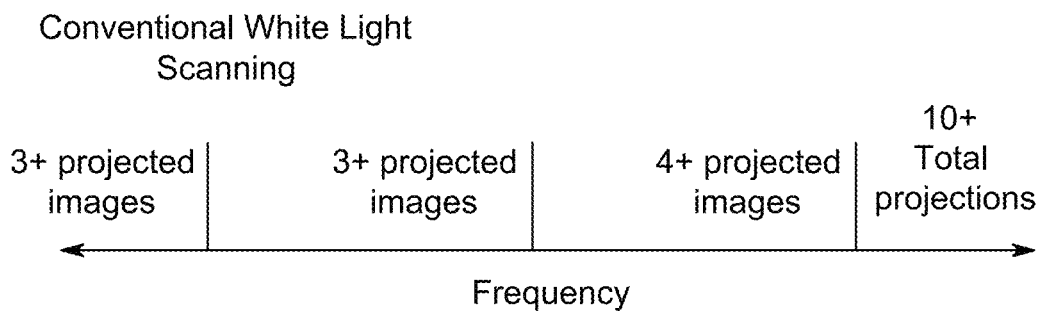
FIGS. 3A-3C show spatial frequencies used in structured light scanning processes.

FIG. 3A shows pattern spatial frequencies used in a conventional phase-shift structured light scanning process. The X axis (horizontal axis) represents pattern frequency with low frequencies shown to the left and high frequencies shown to the right. Spatial frequency for phase-shift scanning patterns refers to the number of pattern stripes (e.g. pattern stripe spatial periods) per unit length or per image width (e.g., the inverse of the spatial period or distance between stripes). Stripes within each image may be sinusoidal variations of intensity or they may be other patterns of varying intensity. Images with stripe patterns are also called fringe pattern images or zebra-stripe images. Typical phase shift scanning processes project a set of pattern images with different spatial frequencies. The set of projected images typically includes a number of pattern images with low spatial frequency (in this case three are shown), plus a number of patterns (in this case three patterns) with intermediate spatial frequency, plus a number of patterns with high spatial frequency (in this case four patterns). Examples of low, intermediate and high spatial frequencies are one stripe period per frame, seven stripe periods per frame and sixty-one stripe periods per frame. These frequencies can be chosen to be a wide range of values, but they work together to allow decoding (e.g. determining) which projector pixel location (or in the case of vertical stripes, which projector column) created the light that illuminates a given pixel seen by the image sensor (e.g. camera). Each set of patterns of a given frequency essentially enables finding the projector image column location within a period (e.g. within a stripe), but it does not uniquely provide information about which projector stripe (e.g. which period) within which the location is found. So the high frequencies enable the highest precision determination of which location within some high frequency stripe. Then the patterns of intermediate frequency enable decoding to which group of high frequency stripes. Then the lowest frequency patterns enable determining which broader column area of the image the light came from. The lowest frequency patterns provide poor precision, but when combined with the intermediate and high frequency pattern information, together they uniquely specify a precise and accurate projector pixel column from which the light originated. One challenge is that low and intermediate frequency patterns are often close to or overlapping with one or more "light transport frequencies" which are determined by scene or object characteristics which cause light from low or intermediate frequency patterns to be reflected or refracted within the scene and create incorrect illumination levels as sensed by a sensor (e.g. camera), and therefore incorrect depth data when decoded. While projector columns are discussed here with associated vertical (or other non-horizontal) stripe patterns, other scanner configurations may decode projector rows instead via horizontal stripes (or other non-vertical stripe pattern).

Figure 3B:
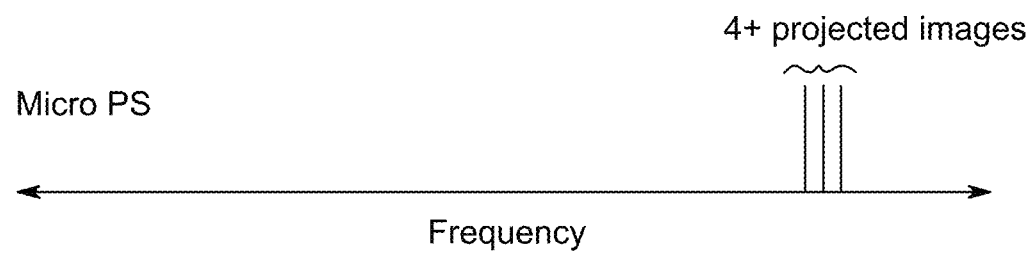

FIG. 3B shows spatial frequencies of a typically monochrome (e.g. greyscale) white light pattern used in the Micro PS structured light scanning process. Note that all patterns of the Micro PS process typically use the same light color (e.g. wavelength on the electromagnetic radiation spectrum). Micro PS is a technique that uses some number of projected image patterns (in this case 4+ are indicated in the figure) which all have high spatial frequency. With correctly chosen pattern frequencies, projector column can be uniquely decoded with only a variety of high frequency patterns and without requiring any low frequency patterns. The downside is that to get good fidelity and confidence in the data, often a large number of patterns must be projected (four is the theoretical minimum, but in practice 12-20 are often used). This is a challenge if the scanned object moves or if reducing scanning time is desired.

Figure 3C:
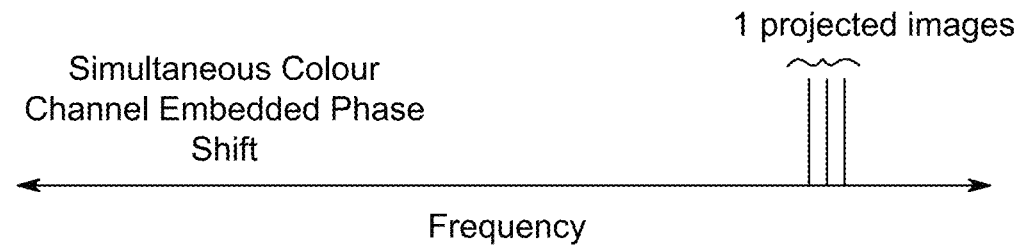

FIG. 3C shows spatial frequencies of a multiple color light pattern used in a modified structured light scanning process. FIG. 3C shows multiple high-spatial-frequency patterns of different wavelengths (e.g. colors) of light combined into a single pattern image (e.g. a single phase-encoded image). Wavelengths may be red, green and blue light, or they may be any other wavelengths which may be combined into a single visible or not-visible or mixed-visibility image.

Figure 3D:
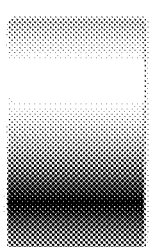
FIG. 3D-3U shows a set of 18 phase images that may be projected as part of a structured light 3D scanning process.
Figure 3E:
Figure 3F:
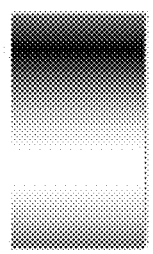
Figure 3G:
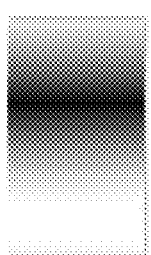
Figure 3H:
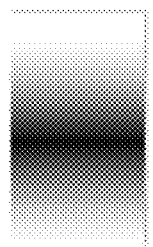
Figure 3I:
Figure 3J:
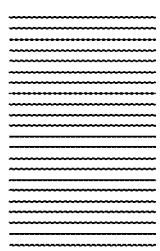
Figure 3K:
Figure 3L:
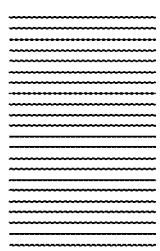
Figure 3M:
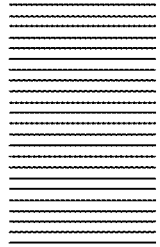
Figure 3N:
Figure 3O:
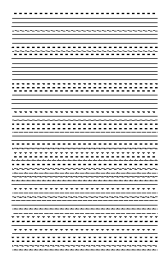
Figure 3P:
Figure 3Q:
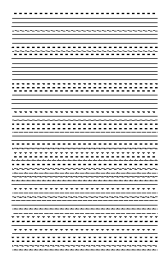
Figure 3R:
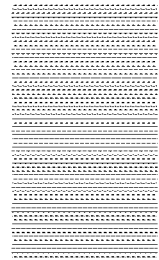
Figure 3S:
Figure 3T:
Figure 3U:

FIG. 3D-U shows a set of 18 phase images that may be projected as part of a structured light 3D scanning process, in which the first five images (FIG. 3D-3H) are low-spatial-frequency images, the second five images (3I-3M) are intermediate-spatial-frequency images, and the remaining eight images (3N-3U) are high-spatial-frequency images.

The spatial frequency of images can be seen at FIGS. 3D-3U, which show low spatial frequency images 3D-3H. In these images, there is one sinusoidal period per image width, resulting in a spatial frequency of approximately 1 with respect to the image width. The single period can be seen at different phases at FIGS. 3D-3H. At FIGS. 3I-3M, it can be seen that there are approximately 24 sinusoidal periods per image width for an intermediate-spatial frequency image, resulting in a frequency of approximately 24 with respect to image width. At FIGS. 3N-3U, it can be seen that there are approximately 66 sinusoidal periods for a high-spatial frequency image, resulting in a frequency of approximately 66 with respect to image width. The spatial frequency when these images are projected onto a scene depends upon how wide the image is when it strikes the scene (e.g. how far the image spreads after it leaves the projector). In a case where the image becomes one meter wide at a reference distance in the scene, these spatial frequencies in the projected images would become 1 per meter for FIGS. 3D-3H, 24 per meter for FIGS. 3I-3M and 66 per meter for FIGS. 3N-3U. More generally, low spatial frequency images can be considered in the range of approximately 1 to 10, e.g., 1 to 10+/−½ per image width. Intermediate special frequencies can be considered in the range of approximately 10 to 40, e.g., 10 to 40+/−½ per image width. High spatial frequencies can be any frequency above approximately 40+/−½ per image width and up to 200 per image width.

Conventional temporal mapping may have the disadvantage in which, if there exists relative motion between the scanner and the object being scanned, the mapping may not be accurate because the same projected fringe-pattern pixel coordinates from different captures may land on different 3D locations on the object at different times thus causing error. Therefore, it may be desirable to avoid temporal mapping by encoding all required information to extract unambiguous, accurate depth information into a single projected pattern (e.g. a single phase-encoded image). It may be possible and advantageous to project other images as part of each dataset capture cycle that are not a series of fringe patterns (e.g. are not multiple images of stripes and/or are free of stripes) and therefore do not have the problems associated with conventional temporal mapping. For example, one or two frames of continuous color+intensity could be projected before or after a single phase-encoded pattern frame. Continuous value frames could be uniform black, white, saturated color or any combination of color+intensity that is uniform across the frame. The result is that as long as these projected continuous value frames cover the entire area for which depth is to be captured, the values retrieved during capture when these frames are projected will be invariant with moderate relative motion between the capture device and the object being captured. In this way we can accomplish a motion-invariant temporal mapping as long as the relative displacement between frames is below a threshold.

A specific encoding scheme: project separate frames of uniform red, green, blue, white (full illumination), black (no projected illumination), and optionally yellow, purple and cyan (=blue+green) and other optional combinations. Then project one phase-encoded pattern frame (e.g. non-constant color and/or intensity image) where pixel column colors are created by combining three non-equal co-prime frequencies that are higher than the threshold frequency for global illumination (e.g. light transport) problems (typically these must be below a period of about 5 mm at a distance of interest in the scene=frequency above 200/meter depending on the optical and material characteristics of the scene and/or object to be scanned). Pixel colors may also vary across rows in a similar manner for example by choosing non-equal co-prime frequencies for each color so that color channel values may vary in a continuous way along both rows and columns. With correctly chosen frequencies, patterns of colors can be constructed that do not repeat within three-pixel by 3-pixel blocks within the image. Accurate depth information can then be calculated from the specific RGB values of blocks of pixels while using the values from the captures of the uniform frames as reference for the max and min values of the range for each color. It may also be possible to add even more robustness to the values by further limiting or down-selecting the values used in constructing the phase-encoded pattern—for example by using a low-bit depth or using only certain combinations of light wavelengths.

Instead of constant vertical (or horizontal) stripes (i.e. where repeating pattern of pixels is the same for each row (or column in the case of horizontal stripes)), it is possible to encode a different pattern in each row such that each column forms a non-repeating pattern. It is then possible to perform bit-wise operations on each sensor (e.g. camera) pixel which weight neighboring sensor pixels from rows above and below in the captured images, so that calculations from each pixel are able to decode or "unwrap" a specific phase of a base frequency (typically but not necessarily) corresponding to the width of the projected images (i.e. the number of pixels in the width of the projected image). Then the specific single pixel value is used to get an accurate relative phase or intra-phase value. Encoding may be chosen such that the overall phase may be recovered even when data from some of the adjacent captured-image pixels is of poor quality or missing due to poor capture conditions, surface discontinuities.

It may be desirable to explicitly not capture depth data for pixels that lie immediately on or adjacent to a discontinuity or other challenging capture condition. At first this might seem like a limitation, but a hand-held capture device with good user feedback may enable and encourage the user to move and/or change orientation to capture data in those actual locations on the scanned object that were not usable in one captured dataset by capturing additional datasets from new locations and/or orientations in which they are no longer at a discontinuity or other compromised condition in the captured dataset.

Encoding: using 3 channels (e.g. in this example R, G, B, or alternately any other set of sufficiently separate wavelengths such as IR, Green, UV etc) with 6 bit encoding (e.g. 64 levels for each channel) in 3 locations (pixel of interest plus 2 adjacent pixels), there are 262,144 total permutations (allowing repetition of colors and values). If a square image of 360×360 pixels (by way of example) is to be projected, (note that there can be a wide range of possible image sizes and resolutions), then only 129,600 patterns are needed. This arrangement, thus provides a degree of redundancy that improves performance and reliability.

One way of encoding is to assign each row a color channel and have pixels going across the row with intensity values changing according to a sinusoid to encode relative phase. Or, it may be advantageous to use a sawtooth pattern for relative phase.

Single Frame Capture for Accurate Depth Acquisition/ Redundant Depth Encoding:

It is desirable that, for a given pixel (or sub-pixel location) in the image acquired by the camera, the system identifies what projector pixel (or most importantly, what projector column) primarily projects the light that is reflected from the object being scanned back to this camera position (i.e. what projector coordinates or projector column coordinate correspond(s) to these camera coordinates).

Figure 4A:
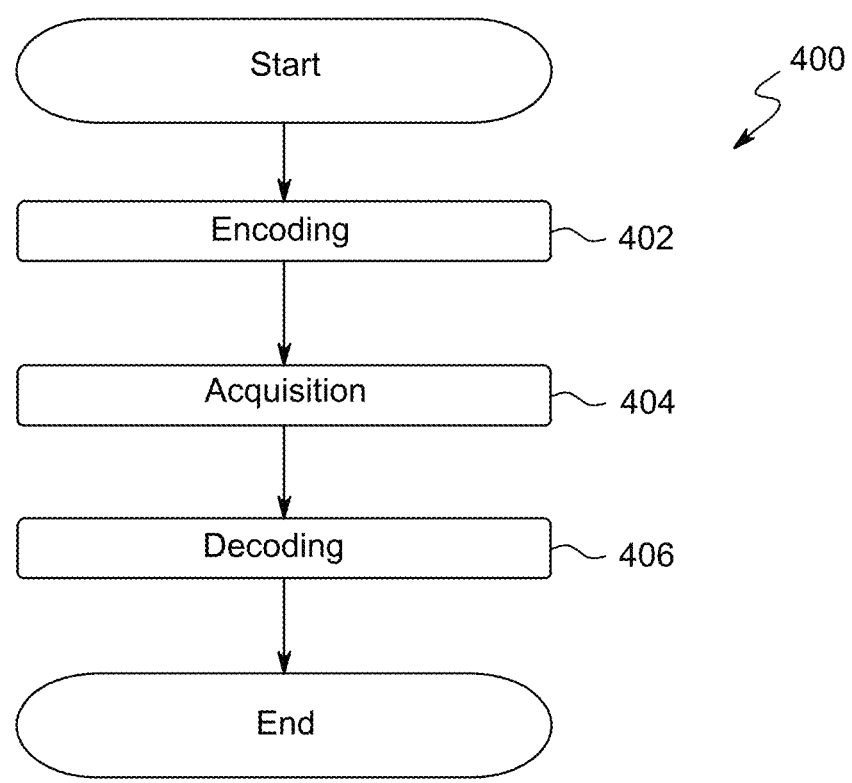
FIG. 4A is a flow chart depicting an overview of encoding, acquiring, and capturing data.

FIG. 4A is a flow chart depicting an overall method 400 of encoding 402, acquiring 404, and decoding 406 data according to one or more aspects of the disclosure. Encoding step 402 typically involves creating an image to be projected by a light source (e.g. projector) in which one or more light patterns is used to create a unique code corresponding to each projector pixel. Step 402 may also involve projecting the image(s) onto an object or scene in order to complete the encoding of the object or scene. Acquiring step 404 involves capturing sensor data (e.g. capturing images with a sensor or camera) of a scene or object under the influence of the one or more encoded light patterns from step 402. In decoding step 406, the images captured in step 404 are used to determine (e.g. decode or alternately look up) which projector coordinates projected the light at each (or any relevant) sensor coordinates.

Figure 4B:
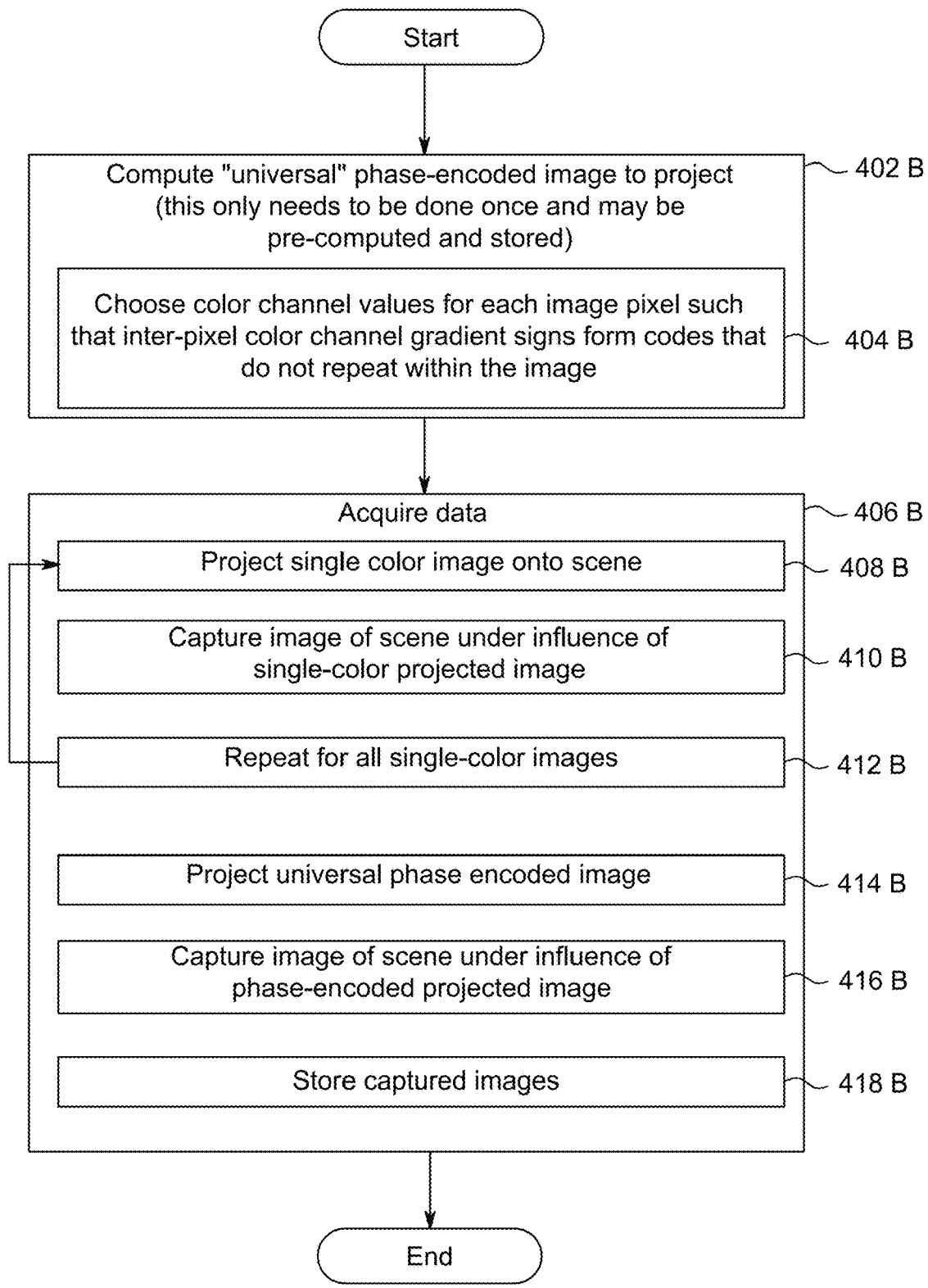
FIG. 4B is a flow chart depicting a method of encoding a scene with a single phase-encoded image and acquiring data according to one or more aspects of the disclosure, in which a phase-encoded image is an image in which one or more projector coordinate values are encoded in the pixels of the image, and encoding may be via pixel values for brightness, color, other pixel characteristics or a combination thereof.

FIG. 4B is a flow chart depicting a method of encoding a scene with a single phase-encoded image and acquiring data according to one or more aspects of the disclosure.

At block (e.g., a "step") 402B, compute "universal" phase-encoded image to project (in one example this may only be done once and may be pre-computed and stored).

At block 404B, choose color channel values for each image pixel for the phase-encoded image such that inter-pixel color channel gradient signs form codes that do not repeat within the image. Alternately pixel color channel values (or wavelengths in the case of other areas of the electromagnetic spectrum) may be chosen such that values of the gradients between an image pixel and adjacent pixels form the code. Using signs of gradients creates fewer possible codes but signs of gradients may be more robust to environmental factors such as environmental illumination and hard-to-scan materials. Using gradient values allows more possible codes.

At block 406B, acquire data. This block may be a set of sub-steps, here shown to include steps 408B to 418B.

At block 408B, project a single color image onto scene.

At block 410B, capture image of scene under influence of single-color projected image.

At block 412B, repeat block 408B and 410B for all (or a predetermined subset of) single-color images. Single color images are used to establish a reference sensor value in pixels of captured images which corresponds to a known illumination intensity and wavelength. Alternately these images may be any combination of one or more reference wavelengths that is relatively invariant across the projected image pixels.

At block 414B, project universal phase encoded image (e.g. the image created in step 404B).

At block 416B, capture image of scene under influence of phase-encoded projected image.

At block 418B, store captured images from steps 410B, 412B and 416B.

Figure 4C:
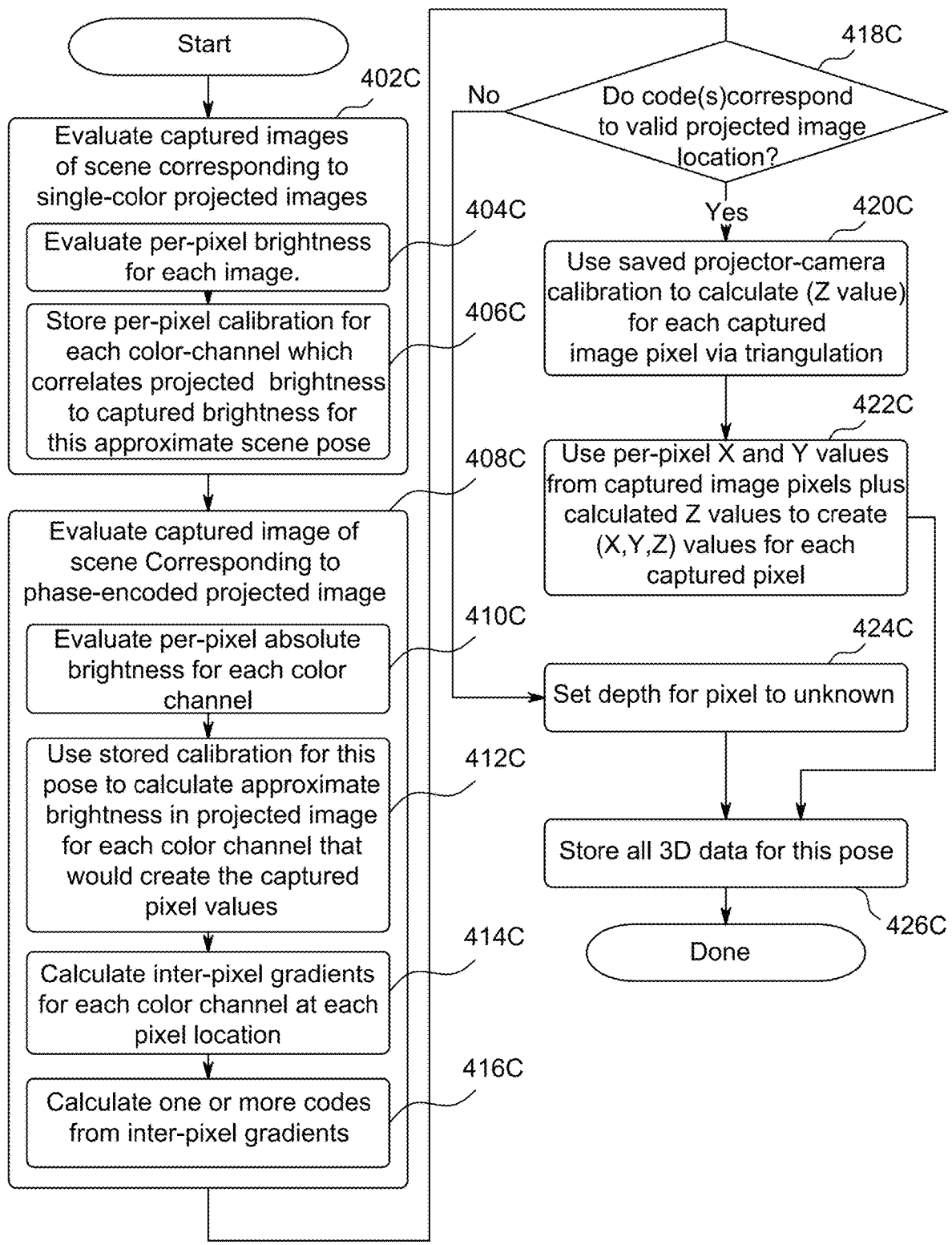
FIG. 4C is a flow chart depicting a method of decoding 3D point data from single phase-encoded scene image capture data.

FIG. 4C is a flow chart depicting a method of decoding 3D point data from single phase-encoded scene image capture data.

At block 402C, evaluate captured images of scene corresponding to single-color projected images.

At block 404C, evaluate per-pixel brightness for each captured image.

At block 406C, store per-pixel calibration for each color-channel which correlates projected brightness to captured brightness for all camera pixels for this approximate scene pose. Camera pixels that have out-of-range values or maximum or minimum values (for example 0 or 255 if pixel color channel scale is 0 to 255) may be marked as being "out-of-range" or "no-data" for the corresponding image or for any dataset derived from the corresponding image(s).

At block 408C, evaluate captured image of scene corresponding to phase-encoded projected image. This step may include sub-steps 410C-416C.

At block 410C, evaluate per-pixel absolute brightness for each color channel.

At block 412C, use stored calibration for this pose to calculate the corresponding approximate brightness in projected image for each color channel that would create the captured pixel values.

At block 414C, calculate inter-pixel gradients for each color channel at each pixel location for the image captured under the influence of the phase-encoded projected image.

At block 416C, calculate one or more codes from inter-pixel gradients.

At decision block 418C, determine if code(s) correspond to valid projected image location (e.g. projected image pixel coordinate). For example if only one code is calculated, determined if that code corresponds to a valid projected image location. Alternately, if more than one code is calculated, determine if all codes or a majority (e.g., greater than 50%) of codes correspond to a projected image location that is both valid and is the same for all or a majority of the codes.

If "yes" at decision block 418, proceed to block 420C to use saved projector-camera calibration to calculate depth (e.g. Z value) for each captured image pixel via triangulation.

At block 422C, use per-pixel X and Y values from captured image pixels plus calculated Z values to create (X,Y,Z) coordinate (or another appropriate coordinate system) values for each valid captured pixel.

At block 424C, set depth for pixel to unknown.

At block 426C, store all 3D data for this pose. The 3D data from this pose is a dataset and may be combined with datasets from other poses to create a unified, more complete 3D dataset representing an object or a scene.

The system and/or methods shown in FIGS. 4A, 4B and 4C solve the technological problem that relative motion between 3D scanning systems (e.g. projector, camera etc.) and scenes or objects being scanned typically causes errors or at least reduced data accuracy. Errors or reduced accuracy can cause components manufactured on the basis of captured 3D data sets to not fit, not meet required tolerances or even mechanically fail. The inability to handle relative motion causes 3D scanning processes to be slow, inefficient and not able to be used in for some applications where it is desired to capture 3D data. The system and/or methods shown in FIGS. 4A, 4B and 4C solve this problem by enabling reduced error rate and/or higher data accuracy in cases where relative motion is encountered including the use of hand-held scanning systems and/or scanning of moving objects.

Projector coordinates can be encoded in projected images by using a combination of three (3) frequencies for R, G, B channels within each column such that all frequencies are above the light transport function frequencies. Co-prime frequencies (and co-prime numbers of intensity levels found by dividing the maximum intensity by half the pixel-period for each chosen frequency) can be selected to ensure that the full number of unique combinations is attained. For example, use 7 intensity levels for Red, 8 for Green and 9 for Blue. Alternatively co-prime periods can also be selected in the number of pixels to achieve a similar result, for example 13, 14, and 15 pixels for Red, Green and Blue respectively. Using the first approach (7, 8, and 9 levels) yields $7*8*9=504$ unique RGB value combinations. These RGB values can be used as a code, where each unique combination corresponds to a unique global phase (i.e. unique projector pixel-column correspondence from received camera image to projected pixels. Interpolation of the values may even allow sub-pixel resolution, which is generally desirable since it is often feasible to use a camera resolution which is higher than the projector resolution. Global phase, in turn can be directly mapped to accurate depth information.

If it can be guaranteed that all the independent R, G, B values are read correctly to the level of precision required to discern between the levels used, then the system could capture global phase accurate depth information with a single pattern image frame plus additional motion-invariant reference frames (i.e. frames that have spatially uniform color or illumination projected). The frequencies chosen are above the light transport frequencies in most cases (see http://www.cs.columbia.edu/CAVE/projects/MicroPhase-Shifting/), and using the uniform-color reference images/captures provides a degree of invariance to global illumination. See FIG. 3C. However, varying materials, object colors, textures, other optical properties and significant slopes of the object being scanned may, in many cases, cause errors greater than the illumination level resolution. If this occurs, for example if a blue value of 6 was projected at a projector location but for some reason a value of 5 was read from the corresponding camera pixel, the net reading may be off by many units in the encoding scheme (similarly to the way a tens or hundreds digit being off by 1 causes a base 10 number to jump by more than 1). These potentially large errors would appear as significant noise or spikes in the resulting 3D data and they would be very challenging, or impossible, to filter out.

One way to eliminate the possibility of such errors is to use redundant encoding of information. By specifically encoding absolute phase in two or more ways per location, the results of the different encoding may be compared and thereby a much higher confidence level in their validity may be obtained. In the cases where the different encodings do not decode to the same or acceptably similar absolute phase or depth, the data may be discarded or flagged for further analysis. In this way a much more robust depth data set may be created from a single dataset consisting of a single pattern frame (single non-motion-invariant frame) plus optional motion-invariant frames.

A method for multiple absolute phase or depth encoding: One way to robustly and redundantly encode absolute phase or depth is to encode it in local gradients. The present system and/or method can use one encoding scheme along each row. With 7, 8 and 9 intensity levels for R, G and B respectively, there can be 504 uniquely encoded values. Each pixel has 8 neighbors, but since the two same-row neighbors are already part of a first encoding scheme, for best redundancy, it is desirable to avoid using these same-row pixels in the computation, and therefore use only the 6 projected pixels that are adjacent in different rows. Adjacent rows can be offset by a suitable number of pixels (e.g. gradients may be calculated between pixels separated by some number of rows, rather than between pixels in adjacent rows) so that, in most cases, the system identifies differences when subtracting channel intensity values from one row to another—or subtracting diagonal values. The values of the results of the subtraction operations may often not be exact or accurate because of non-ideal conditions as described above. In general, however such detailed results are not required by the system and method, as subtracting floating point, or potentially, integer intensity values would yield more information than required for an accurate computation. The system and method can classify each gradient as positive, negative or near zero. With 3 color channels to compare and 3 potential states per channel, there is a total of $3^3=27$ potential combinations per pixel comparison. With 6 pixels to compare that gives us $27^6=387,420,489$ total potential unique codes. This is still many more than needed so further robustness can be added to error by allowing for one, two or more "bad" or indeterminate pixel comparisons. (This could happen for example if conditions prevent acquisition of some pixel values or if the pixels are near an edge or discontinuity). If only 3 valid pixels are employed, then there are $27^3=19,683$ unique locations to be decoded.

Further robustness can be provided by assigning extra codes to allow for different outcomes for gradients. A set of codes can be defined, created from possible gradient combinations corresponding to a particular projector pixel that include the most likely errors or inaccuracies. The system and method can undertake a computation or look-up operation for all of these errors or inaccuracies, including the errors to yield the correct absolute phase, which can then be uniquely correlated to a unique depth value by triangulating with the camera offset.

Gradient Calculation

For each location of interest in camera pixel coordinates, the system and method can find illumination gradients between it and locations adjacent to it (or locations offset from it by a predetermined number of rows, columns and/or pixels) and it can potentially find inter-pixel gradients with respect to each channel or type of sensor element in the camera sensor array. For discussion here, we will refer to Red (R), Green (G) and Blue (B) channels (collectively RGB), but in practice there can be other channels such as IR, UV, or any number of other wavelengths or frequencies. The sensor elements may respond to electromagnetic radiation (photons) or they may respond to electrons, protons or other particles or waves. If using an RGB image sensor, inter-pixel gradients can be found for each of the R, G and B channels AND each of these can be for each adjacent pixel, or camera-coordinate location. To find gradient values subtract the values of each R, G and B channel at the location of interest from the respective R, G and B values of a neighboring camera pixel (or camera coordinates in the case of sub-pixel evaluation). The results of this subtraction operation can be referred to as "gradient values" which may be values such as integer values, binary values, floating point values, etc and may have a sign, or in some cases they may be very close to zero. In some cases as described below it may be useful to convert these gradient values into simpler "gradient signs". The conversion to gradient signs can define ranges, for example any result less than −1 may be cast to a "negative gradient sign" and any result greater than 1 may be cast to a "positive gradient sign" and any result in between −1 and 1 may be cast to a "zero gradient sign" or in some cases it may be useful to cast or classify such results as "indeterminate gradient sign". Other floating point or integer values can be used as well, for example the range for casting to zero gradient to be −2.3333 to +2.3333 with negative and positive signs being on the outsides of that range. Or any other numbers can be chosen to delineate the gradient sign conversion range. Using gradient signs instead of numerical values for gradients makes the computation of codes robust against potentially widely varying measured intensity values vs. intensity values under ideal conditions.

FIG. 5A shows schematic version of a portion of an image 500 to be projected onto an object to be scanned (e.g. a block of pixels). A pixel of interest 502 is shown surrounded by neighboring pixels 504, a same pixel column 506, a right adjacent pixel column 508, a left adjacent pixel column 510, a pixel 512, a pixel 514, a pixel 516, a pixel 518, a pixel 520, and a pixel 522, a pixel 524 and a pixel 526. Pixels are shown arranged in rows and columns such as a left-adjacent column 510, a same-pixel column 506, a right-adjacent column 508, an upper-adjacent row 530, a same-pixel row 528, and a lower-adjacent row 532. Pixels 516, 512 and 514 are in upper-adjacent row 530. Pixels 524 and 526 are in the same-pixel row 528 as pixel of interest 502. Pixels 522, 518 and 520 are in lower-adjacent row 532. Pixels 516, 524 and 522 are in left-adjacent column 510. Pixels 512 and 518 are in same-pixel column 506. Pixels 514, 526 and 520 are in right-adjacent column 508. These example pixels may be adjacent or they may be separated by some number of pixels (not shown) between each shown pixel.

Figure 5B:
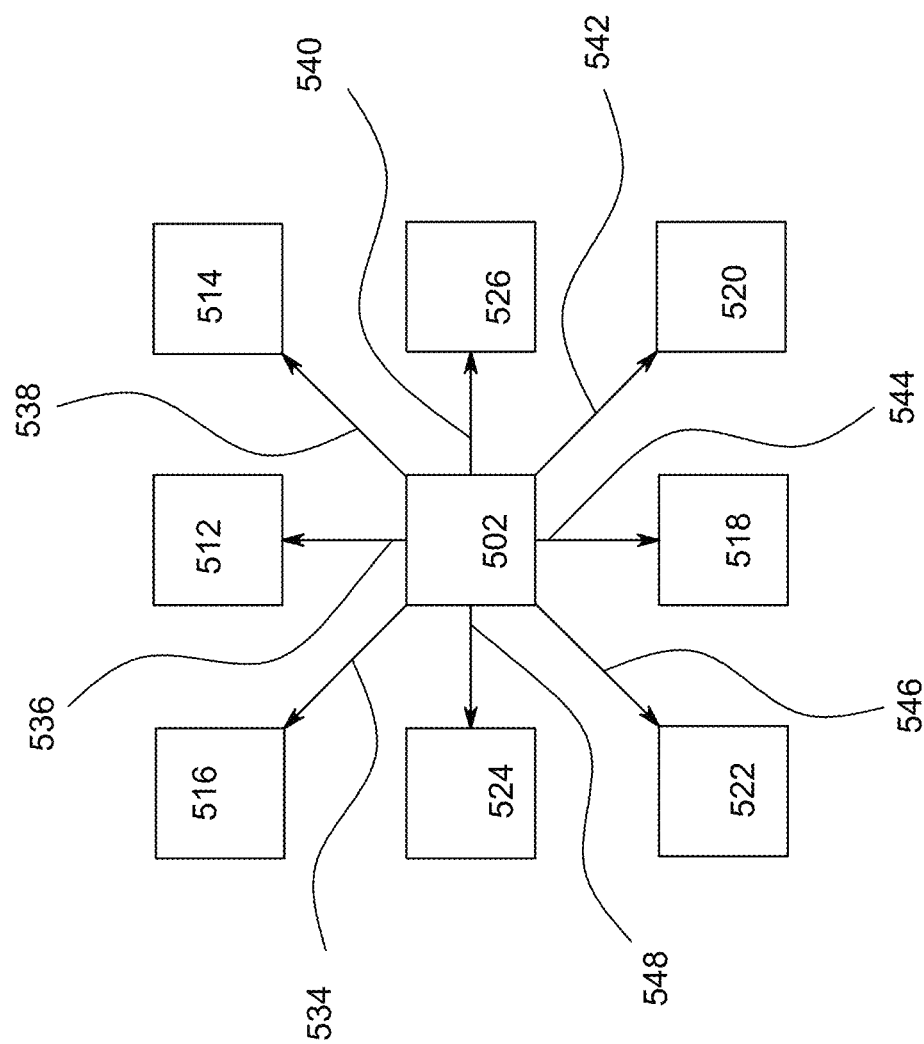
FIG. 5B shows a schematic partial image from a structured light scanning process.

FIG. 5B schematically shows the same pixels as FIG. 5A, with directions for gradients shown between them. FIG. 5B is purely schematic and only represents relative spatial position of pixels, but does not represent actual spacing. Gradients 536, 538, 540, 542, 544, 546, and 548 may represent changes in pixel color or intensity values in different directions. For example gradient 534 may represent the difference in intensity values between pixel of interest 502 and pixel 516. Furthermore, gradients 536, 538, 540, 542, 544, 546, and 548 may each represent more than one gradient between their respective pixels, for example they may each represent a gradient corresponding to each color channel that the projector (not shown) is capable of projecting (for example a gradient for a red channel, a gradient for a green channel, and a gradient for a blue channel).

Pixel color and/or intensity values could be the same for the image projected by the projector and for the image captured by a camera aimed at an object or scene to be captured under "ideal" conditions—e.g., the object is a flat plate with uniform optical properties and the camera and projector fields of view are arranged so that the pixels map 1 to 1. While conditions during scanning rarely match this ideal, this is a good place to start for discussion, and the sign of gradients described often remains the same for many camera pixel locations even when images are projected onto complex shapes.

Figure 6A:
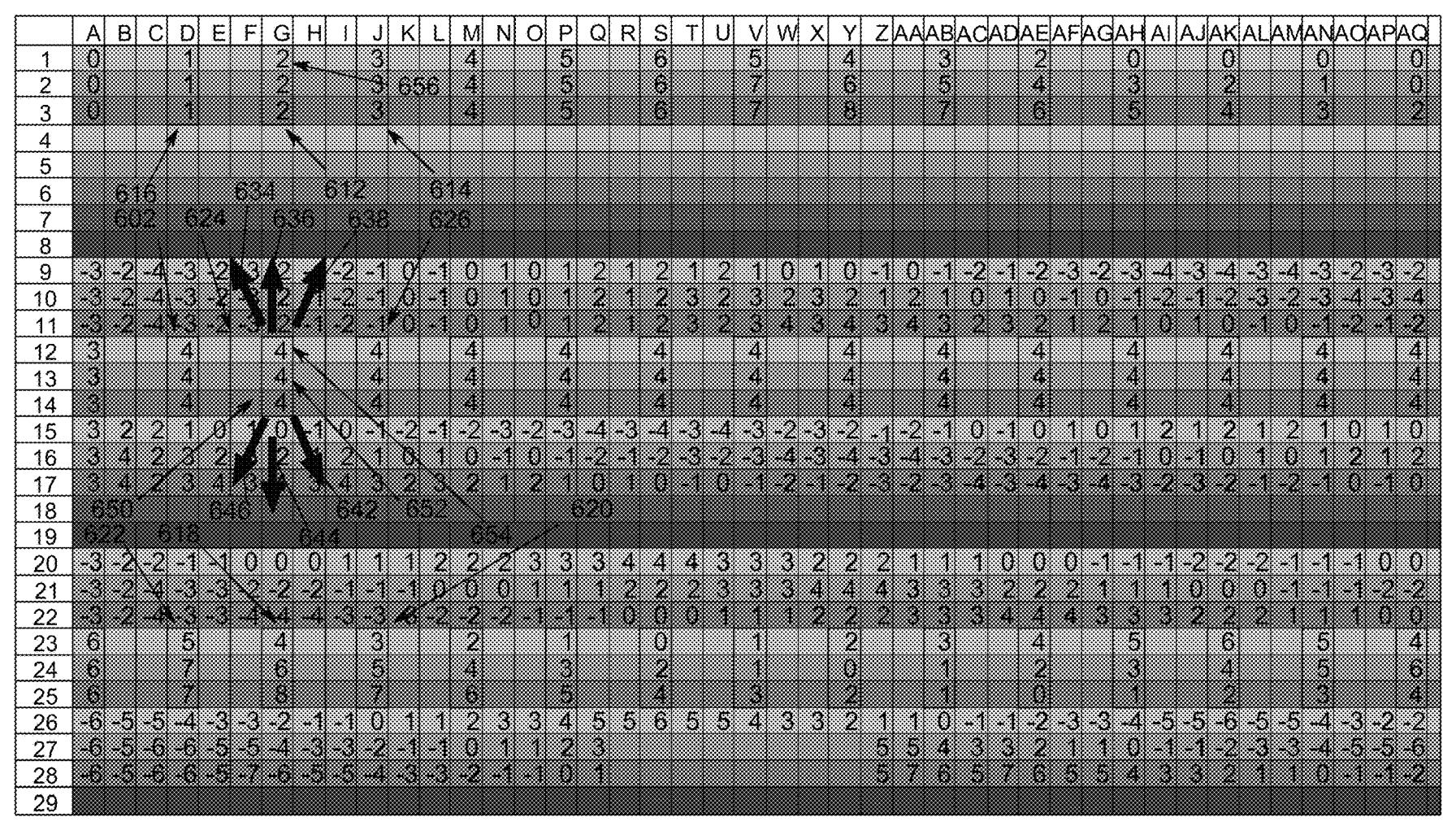
Figure 6B:
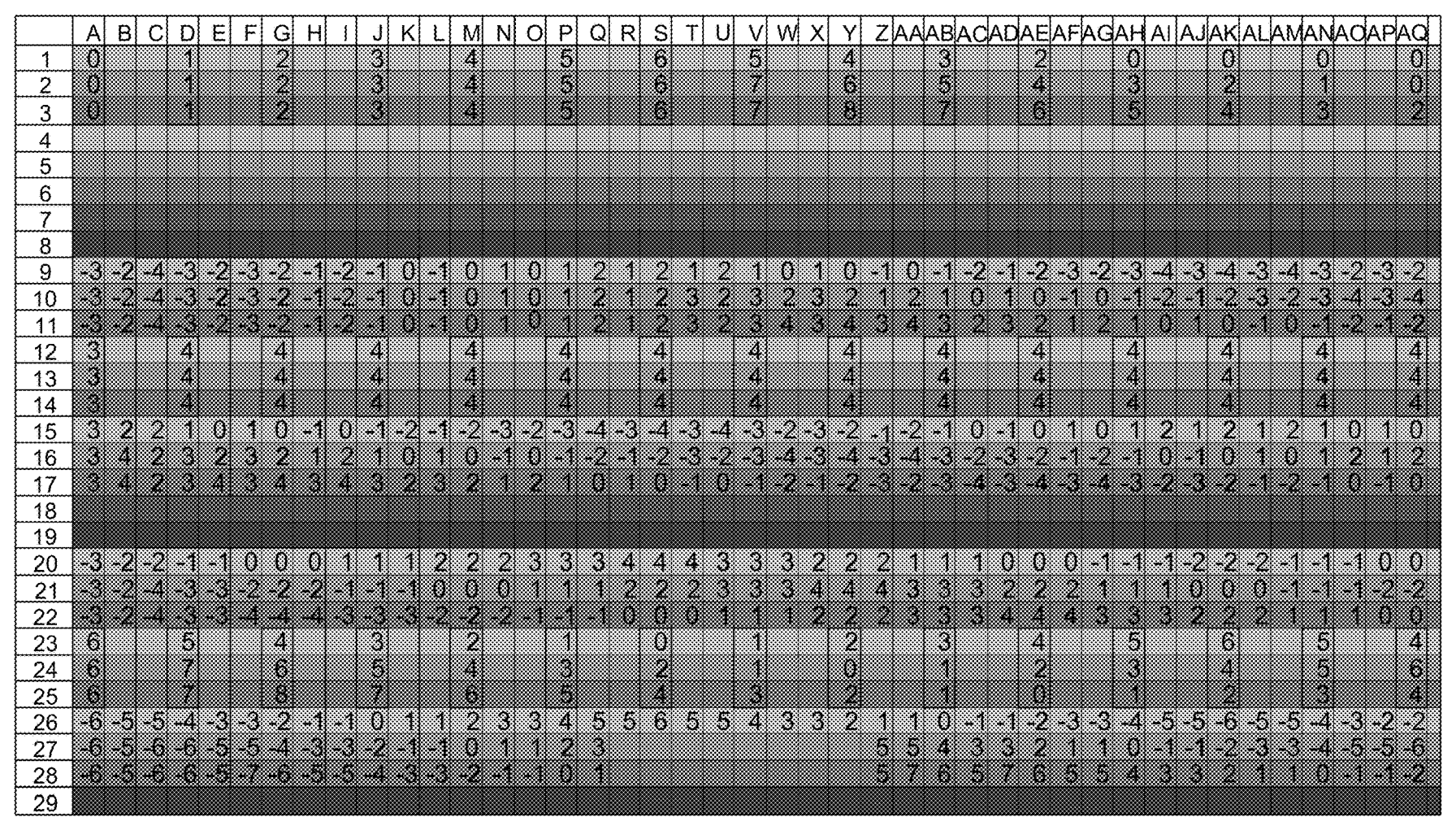

FIGS. 6A and 6B can represent either pixels of a projected image or an image captured by a camera under ideal conditions and with good calibration between projector and camera. FIGS. 6A and 6B are the same except FIG. 6A has labels and FIG. 6B has no labels so that items are not obscured. FIGS. 6A and 6B show a schematic version of the pixels from FIGS. 5A and 5B, with intermediate integer gradient results shown in between the pixels. Pixels 616, 612, 614, 624, 602, 626, 622, 618 and 620 correspond to pixels 516, 512, 514, 524, 502, 526, 522, 518 and 520 respectively. FIGS. 6A-6E are purely schematic and only represent relative spatial positions of pixels, but do not represent actual spacing. Extra room has been provided in the figures to show intermediate gradient results. In real images gradient results may be held in computer memory and are not actually represented directly in the images. Pixel 602 is shown as having a blue channel value 650, a green channel value 652 and a red channel value 654. All pixels may have corresponding color channel values. Rows 1, 12 and 23 have red channel values, rows 2, 13, and 24 have green channel values and rows 3, 14 and 25 have blue channel values. Gradients of color or intensity values may be calculated in any direction between any two coordinate values provided there is a way to obtain the color channel or intensity values at the points. In FIGS. 6A and 6B gradients are shown calculated between discrete pixels, but this need not necessarily be the case. It may also be possible to evaluate or obtain color or intensity values in-between pixels. Gradient directions 634, 636, 638, 646, 644 and 642 are shown which correspond to gradients calculated from coordinates of pixel 602 to coordinates of neighboring pixels. Each gradient labeled here may correspond to separate gradient values for each color or intensity channel, for example gradient direction 636 may have values that are calculated by subtracting the intensity values at coordinates for pixel 602 from the intensity values for coordinates of Pixel 612 for each respective channel. In this specific example a red component of gradient 636 is calculated by subtracting a red value 654 of 4 for pixel 602 from the red value 656 of 2 for pixel 612 yielding a red component of gradient 636 with a value of −2 which means that the red intensity declines by a value of 2 as we move the distance and direction between pixel 602 and pixel 612. Similar calculations may be made for green channel 652 and blue channel 650 for pixel 602. Similar calculations may be made for red green and blue channels between any two sets of coordinates. In FIGS. 6A and 6B, gradients from pixel 602 are only shown calculated in directions 634, 636, 638, 646, 644 and 642. While gradients could be calculated from pixel 602 for all 8 neighboring pixels (or for any other pixels), we have chosen to use these 6 gradient directions in this example as these gradients yield enough information to encode and decode locations even in the presence of errors.

Figure 6C:
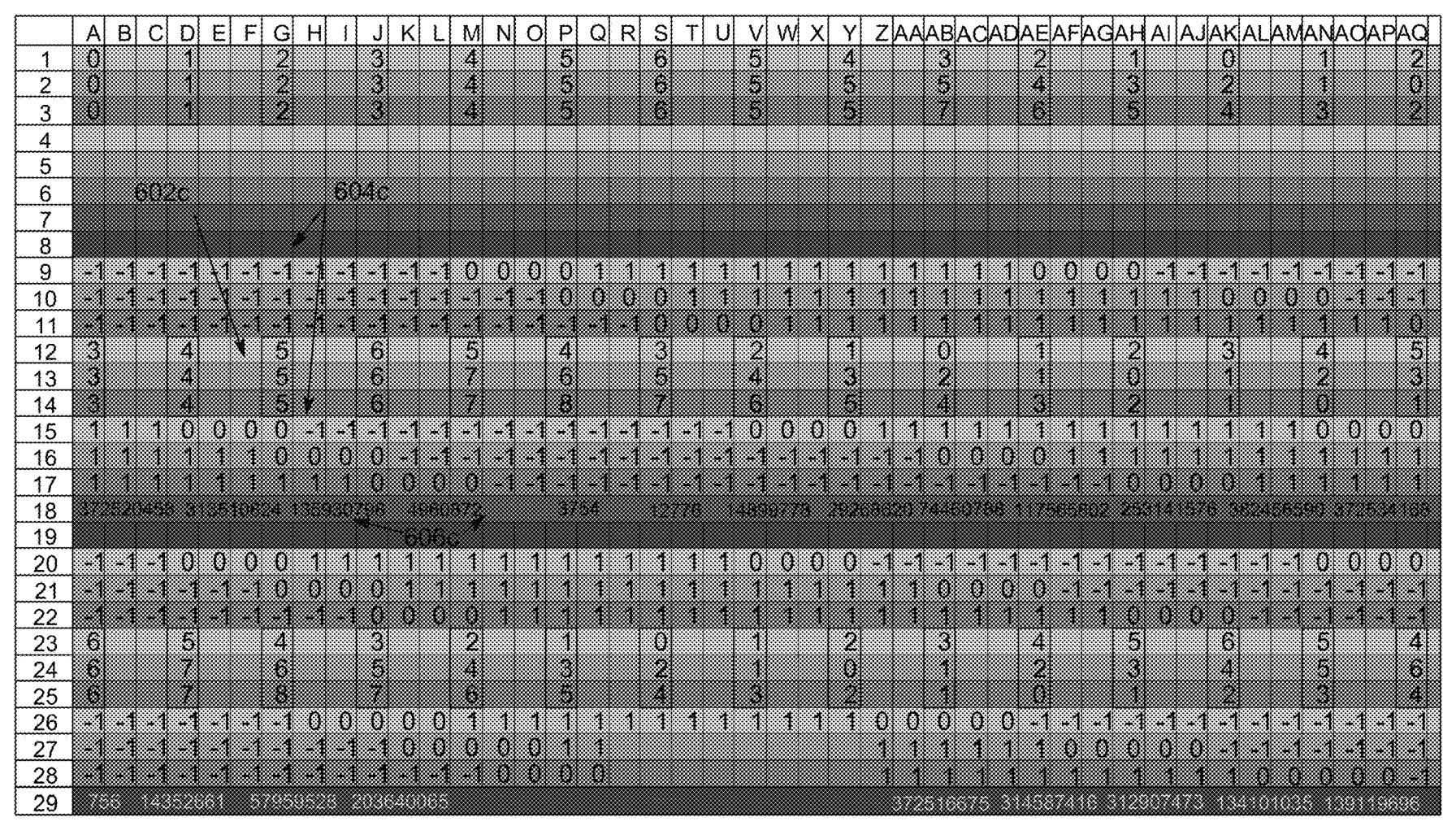

FIG. 6C shows the same pixels from FIGS. 6A and 6B, but instead of showing the integer gradient values, gradient components have been converted to "signs" (e.g. positive, negative or no sign which are represented as 1, −1 or 0 respectively which may be used as ternary values). Alternatively, signs could also be taken as either positive or negative (without a "no sign state") which could then be used as binary values. Then "location codes" have been computed using the gradient signs around each pixel. The location codes correspond to coordinates in the projected image, so location codes that are computed from a camera image during 3D scanning may be used to find the corresponding projector image location which in turn may be triangulated to yield a unique depth value. There are many ways that location codes can be computed. We have chosen to illustrate just one of the many possibilities here. Pixel 602c is a location of interest, with Red, Green and Blue channel intensity values similar to FIGS. 6A and 6B. Gradient sign values 606c may be ternary values computed from gradient values (such as those in FIGS. 6A and 6B) as described below. Location codes 606c may be generated based on gradient sign values 604c.

One version of gradient signs and one version of codes that may be computed is by using ternary sign values for RGB gradients over 6 neighboring pixels as ternary numbers. The codes shown are large numbers because gradients from 6 neighboring pixels are used to create the codes. The codes would have a smaller maximum range if only 4 or 3 of the neighboring pixels were used to create the codes. The gradient signs in this figure were computed using an effective range of gradient values within which to assign "zero gradient" value of −1 to 1. Negative gradient signs are shown as "−1". Zero or undefined gradient signs are shown as "0" and positive gradient signs are shown as "1". For example, if a gradient component value was −2 or less, its corresponding gradient sign here is negative and is shown as −1. If a gradient component value was −1, it is decided to have a "zero gradient" and its gradient sign is shown here as 0. If a gradient component value was 1, it is decided to have a "zero gradient" and its gradient sign is shown here as 0. If a gradient component value was 2 or greater, its corresponding gradient sign here is positive and is shown as 1. Gradient codes 606c were generated here by using the gradient sign as a ternary number (i.e. 0, 1 or 2) where a negative gradient sign represents a 0, a zero gradient sign represents a 1 and a positive gradient sign represents a 2. Gradient signs from the 3 channels for each of the six gradient directions were used as 18 "digits" of ternary numbers (similar to binary numbers, but ternary numbers are base 3 instead of base 2). Codes 606c are shown here converted to base 10 numbers since they are generally easier for humans to think about, but these can be represented as base 3 numbers or any other base desired and they can be used the same way as location codes.

Figure 6D:
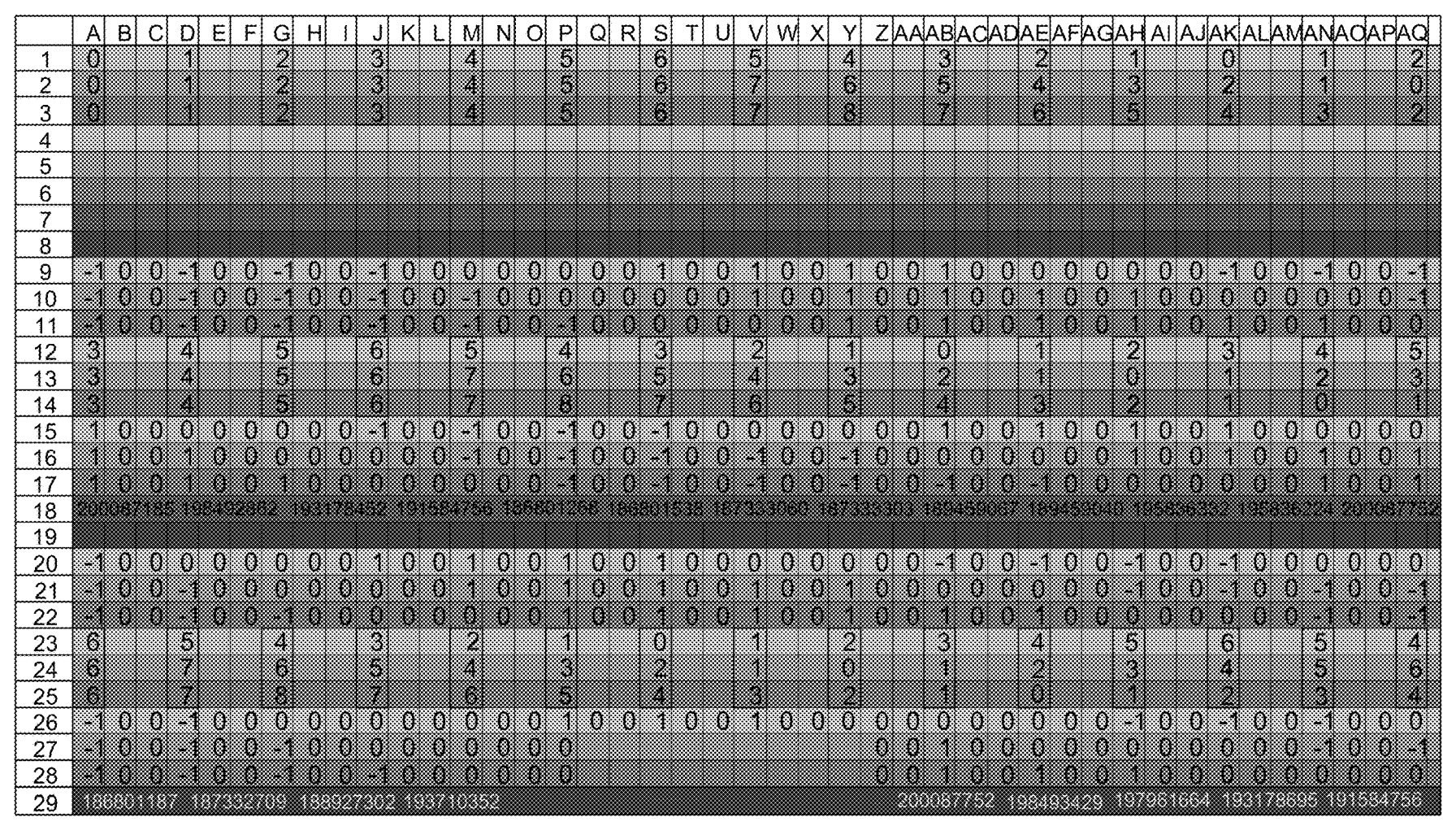

FIG. 6D shows another version of gradient signs. The pixels and gradients in FIG. 6D are the same as FIG. 6C except that a different range for "zero gradient" has been used. The gradient signs in this figure were computed using an effective range within which to assign "zero gradient" value of −2 to 2. More of the gradient signs are therefore zero in this version. Either of these ways or many other schemes can be used to compute gradients or gradient signs or location codes.

Figure 6E:
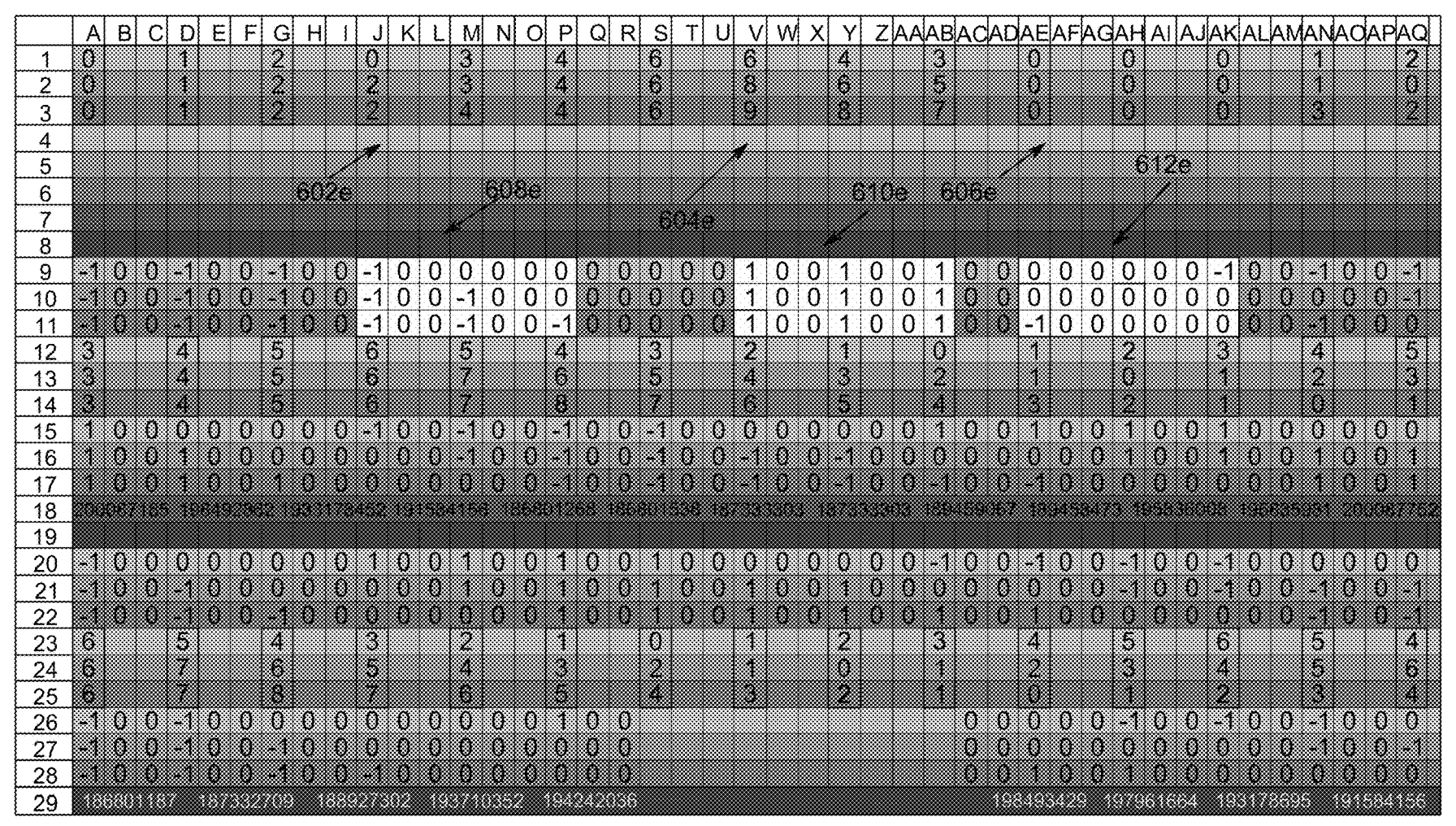

FIG. 6E shows an alternate version of the same pixels and gradients from FIG. 6D, but with some changes to some pixel red, green, blue (R,G,B) channel values to demonstrate the influence of imperfect, real-world conditions that we might encounter in camera images capturing intensity data when one of the ideal structured light patterns described here (such as if the pattern of FIG. 6B) was projected onto an object to be scanned. In FIG. 6E all items are the same as FIG. 6D except where otherwise noted and highlighted. Pixel channel values 602e ((row,column) locations (1,J), (2,J), (3, J), (1,M), (2, M), (1, P), (2, P), (3,P) have been adjusted to be lower than their ideal values, simulating a condition where lower intensities are captured for an area compared to the ideal values. Pixel channel values 604e ((row, column) locations (1, V), (2, V), (3, V), (1, Y), (2,Y), (3, Y), (2, AB), (3, AB) have been adjusted upward to simulate an area where more light is captured than in the ideal case. Pixel channel values 606e ((Row, column) locations (1, AE), (2, AE), (3, AE), (1, AH), (2, AH), (3, AH), (1, AK), (2, AK), (3, AK) have been adjusted to zero (e.g. "0") to simulate an area where no data is captured for some reason. Areas of gradient sign results that would be affected by these pixel intensity values are shown highlighted white rectangular shaped groups labeled 608e, 610e and 612e. In many cases such as gradient signs 608e, the changed channel intensities do not affect the resulting gradient signs and therefore the resulting location codes are also unaffected. All the gradient signs of gradient signs group 608e are not affected by the changed channel intensities as compared to the same gradients (e.g. same row, column elements) in FIG. 6D. In another rectangular group of gradient signs 610e, only a single gradient sign at (row, column) location (11,V) was affected. Specifically, the gradient sign at location (11,V) was a "0" in FIG. 6D and became a "1" in FIG. 6E. All the other gradient signs in gradient signs group 610e are unaffected in FIG. 6E despite the changed (e.g. imperfect) intensity values as compared with the ideal intensity values and resulting gradient signs of FIG. 6D. The one changed gradient sign at location (11,V) does change the location code computed, but for small changes such as this, likely alternative codes can be tracked for each projector location, or an encoding scheme can be used in which fewer sets of gradients are used to create each code, so there are redundant codes. Using one of these approaches, the location is still likely able to be decoded in this situation. Another rectangular group of gradient signs 612e related to the pixels 606e that were altered to have zero intensity values shows more gradient signs that are changed compared to the ideal case. (Row, column) locations (10, AE), (11, AE), (10, AH), (11, AH), and (11, AK) all have gradient values that differ compared to the ideal gradient results of FIG. 6D. In this case, the location codes won't match any projector location (or multiple redundant codes found for this pixel won't match each other) and the data may optionally be discarded and a depth value may optionally not be recorded or may be recorded as a "no data" indicator.

Because more codes are available than are needed to perform the computations of the system and method, codes can be generated that correspond to different bounds for sign selection, for example, the system and method can generate codes using "zero sign" range from −1 to 1, and generate more codes using a zero sign range from −2 to 2.

Each (or a predetermined subset, e.g., at least some) of these codes for a given camera pixel location can correspond to the same phase value and therefore depth. This method provides redundancy and allows determination of the correct phase result despite variations in conditions that create differences in light intensity received at camera pixels under actual conditions vs. light received under ideal conditions.

If the system and method converts gradient values to gradient signs, then for each R, G, and B channel and for each adjacent pixel there are three (3) possible values (+, −, or 0) and these can be treated as ternary numbers (base 3) for each channel. Optionally, the system may not use the 0 signs (i.e. classifying them as indeterminate) and may use only the positive (e.g. +) and negative (e.g. −) values and interpret them as binary values, for example by using "+" as a binary 1 value and "−" as a binary 0 value. For the purpose of the present example, assume there exist base-3 values. So for each of the three chosen pixel pairs (for example pixels of interest 510 to pixel 512) there are three base-3 numbers which allow for representation of 27 unique values (e.g. 0 to 26). This is because there are 3^3=27 possible combinations. If data is used from 3 adjacent pixels, there are 27^3=19,683 unique combinations or "codes" that can be represented. These may each correspond to a unique global phase (e.g. horizontal projector coordinate), although in many cases they may not all be used. Note that in some examples it may be desirable to only use the six immediately adjacent pixels that are not in the same row. While it may be possible to use all eight immediately adjacent pixels, the ones in the same row may be used to independently encode local phase and may therefore have generally small gradients of intensity between them. If the six adjacent pixels are used there are (6×5×4)/(3×2×1) ways to choose three of the six to create codes from the gradients. There are potentially 20 different codes that can be checked for any pixel of interest that should all agree in the ideal case. Most of the 20 choices have some overlap (i.e. they share one (1) or more pixels which gradients are found from), but the codes are different even if some pixels overlap so they still provide a sufficient level of independence. The system and method can also optionally compare two sets of completely independent codes by choosing a second code that uses none of the pixels used in creating the first code.

The above-described techniques and associated computations can be accomplished with simple, fast, bit-wise or bit-shift operations and can operate on values in matrix or vector form which can be much faster than sequential or loop-based calculations. These operations can also be coded so as to be performed on commercially available or customized graphics processing unit (GPU) chips or systems which employ other parallel-processing.

Gradients may be invariant to sub-pixel coordinates: The pixels in an image captured by the camera will usually not be perfectly aligned or mapped with the projector pixels. There are several reasons for this. First, the camera resolution may in general be higher than that of the projector, so a given projector pixel may project light that is received by several camera pixels. Second, projector images generally shift by non-integer camera pixel amounts when they reflect off of displaced object surfaces. Third, calibration may result in non-perfect pixel correspondence. In many cases sub-pixel correspondence is of interest and it is not expected to find the center of a camera pixel perfectly aligned with or corresponding to the center of a projector pixel. The gradient encoding method described here can be invariant to sub-pixel misalignment up to a threshold. The threshold is generally up to one half of a projector pixel. Misalignment of the center of camera pixel A to projector pixel B above one half the width of a projector pixel causes camera pixel A to correspond to the next projector pixel over in the direction of the shift (call it projector pixel C). To put it another way, the sign of the gradients found between a pixel of interest and its adjacent pixels if the pixel centers are aligned will often be the same as the sign of the gradients found when the center of the camera pixel is shifted up to one half projector pixel width with respect to the same projector pixel. This is generally true even more frequently if the shift is up to one half of a camera pixel width (in cases where the camera pixels are smaller than the projector pixels (e.g., camera has higher resolution per corresponding scanned object area than the projector, which may often be the case)). This property of invariance of sign of the gradients to sub-pixel displacements means that there is great robustness for obtaining absolute phase at camera pixel resolution. Additionally or alternatively, the present system or method can look at actual slope values to get sub-pixel information or interpolate between pixels if desired and these potentially finer-resolution data points can be double-checked against the robust pixel-resolution data. As long as gradient values associated with the ideal projected image vary continuously (as they do in some of the methods and systems described here), gradients found via evaluating camera pixel color channel and/or intensity values may be used to determine sub-pixel projector phase and/or coordinates. Redundant sets of camera pixel gradients or codes calculated from pixel gradients may be statistically analyzed to yield probabilities of different sub-projector-pixel locations or a probability distribution of location in projector-image coordinates. Inter-pixel correction factors can also be applied that correct for the effect of large "blocky" projector pixels vs. smaller camera pixels. Specifically, the present system and/or method can pre-test what camera pixel RGB values are found corresponding to different sub-projector-pixel locations under ideal conditions and calibrate and/or create correction factors accordingly. This sub-pixel calibration correction can prevent "jaggy" artifacts that might otherwise appear in the depth data related to the difference in diagonal length to horizontal or vertical length of projector pixels.

The system and method can ensure that each (or at least some predetermined subset) code only maps to a single absolute phase value or projector coordinate value. The remaining potential for error is simply that if the pixel RGB values in the image captured by the camera have significant error, causing many or all of the gradients to have large errors compared with their ideal encoded values in the projected image, then a code can be generated from gradients that is not intended to correspond with the pixel it is generated from. In some applications it may be acceptable to have some errors or noise. But in many applications, errors are either not acceptable or must be greatly minimized.

After acquiring a dataset, "error-checked" absolute phase can be found and therefore depth values corresponding to each camera pixel can be found as follows: Use a single code generated from gradients between this pixel and surrounding pixels to find an absolute phase value. If enough mapped codes exist including likely gradient errors, it is likely that a valid absolute phase value will result. Another approach that may ensure a valid result, is to encode absolute phase using only a subset of the inter-pixel gradients (for example create codes using only 3 or 4 of the inter-pixel gradients). In this scenario, many different codes will be mapped to the same absolute phase value. These can be found, and then the absolute phase can be found redundantly using 2 or more codes generated from the same camera pixel being investigated. If the resulting absolute phase result is the same, the result can be kept with a high confidence that it is correct. If the result is not the same, additional different codes can be generated from this pixel and their corresponding absolute phase values may be checked also. If after checking the desired maximum number of codes there is no much match, or if the desired number of matches is not achieved, either a) the data can be discarded from this pixel or b) the data can be flagged as suspect. In some applications it may be very acceptable or desirable to quickly discard data from a pixel if a match is not found or confidence is not high enough. Using this method, there exists great control over both the computational resources expended to find an absolute phase data point AND also the confidence level in the data that is kept. By requiring a match between 2 or more (or potentially many) absolute phase values from independently encoded gradients each corresponding to the same pixel of interest, substantially 100% confidence (e.g., at least 95%) can achieved that the correct absolute phase has been recorded corresponding to this camera pixel and therefore that the correct absolute depth has been recorded for this location on the object being scanned to the resolution limit afforded by the constraints of the camera, projector and calibration. Stated another way, depth data can be generated with substantially no noise (e.g., 0% to 1% noise). This is distinctly different from and a distinct advantage over current scanning techniques which generate results that almost always have "noise" or some measurable or noticeable errors in the data vs. ground truth. This noise in typical scanning techniques typically limits the practical uses of the data and/or requires extensive extra steps and/or human effort to clean, cull and refine the data to make it suitable for a particular application.

In some examples, it may be desirable to capture higher quality information in limited areas (e.g., give up capture in some areas) than to capture complete depth information for all pixels. In this regard, a user or the system can choose some or even a majority of the projector pixels that can be used purely to encode additional information (or even black-out to avoid ambiguity) for specific other pixel locations corresponding where depth is to be computed. Then depth data for other pixel locations can be captured subsequently to create the desired data-density (i.e. resolution) and coverage. This can be done either by changing the projector pixels which are depth locations vs. auxiliary locations in the projected image(s) and capturing data from the same (or nearly the same) device location/orientation OR by keeping the same information encoding and projected image(s) and intentionally using the motion of the capture device so that capture locations fall on different places on the object being captured over time. Rapid frame-rate capture may aid in the practicality of both of these approaches.

It may also be useful to "abandon" depth values from calculations that do not meet a certain threshold for validity or confidence One aspect of the present disclosure provides a method of projecting different patterns or types of illumination at different times during the capturing of one or more images of a scene.

Multi-Mode Capture Sequence or Process

In one example, a projector can project intermittent bursts of zebra stripes frames (e.g. phase images) to capture depth data sets with one or more full illumination visual photo frames (or movie frames) in between.

Full illumination photo frames can be used to calculate motion trajectory between the intermittent bursts of zebra stripe frames (e.g., depth data sets capture events), where motion trajectory can be a simple delta (position, orientation) between depth data sets, or it can also include position, orientation and 1st, 2nd, 3rd and 4th (and higher) derivatives of position and orientation with respect to time. Where 1st derivatives=velocity and angular velocity, 2nd derivatives=acceleration and angular acceleration, 3rd derivatives=jerk and angular jerk etc.

Bursts of zebra stripes frames may be captured at a rate that is higher than the rate of "photo frames". For example, the sensor can capture a scene at a first frame rate (for example 120 frames per second) that is greater than a frame rate of capture during projection of the full illumination frames (for example 30 frames per second).

Bursts of zebra stripes frames may be treated as approximately static in time, meaning that for most practical purposes, relative motion between the scene and the scanning system would be below a required threshold, for example 0.1 mm. In this regard, the system may be able to neglect position differences between zebra stripes frames.

The sequence of projecting different patterns (e.g., zebra stripe, full illumination, etc.) can be highly variable. In one example, it may be desirable to order the sequence to avoid strobing effect, and instead create the appearance of a more "random" sequence. This can create a more random perception rather than sequential. In this regard, the system can add additional photo full light frames between phase images to decrease visual strobing effect for eyes from white light.

Figure 7:
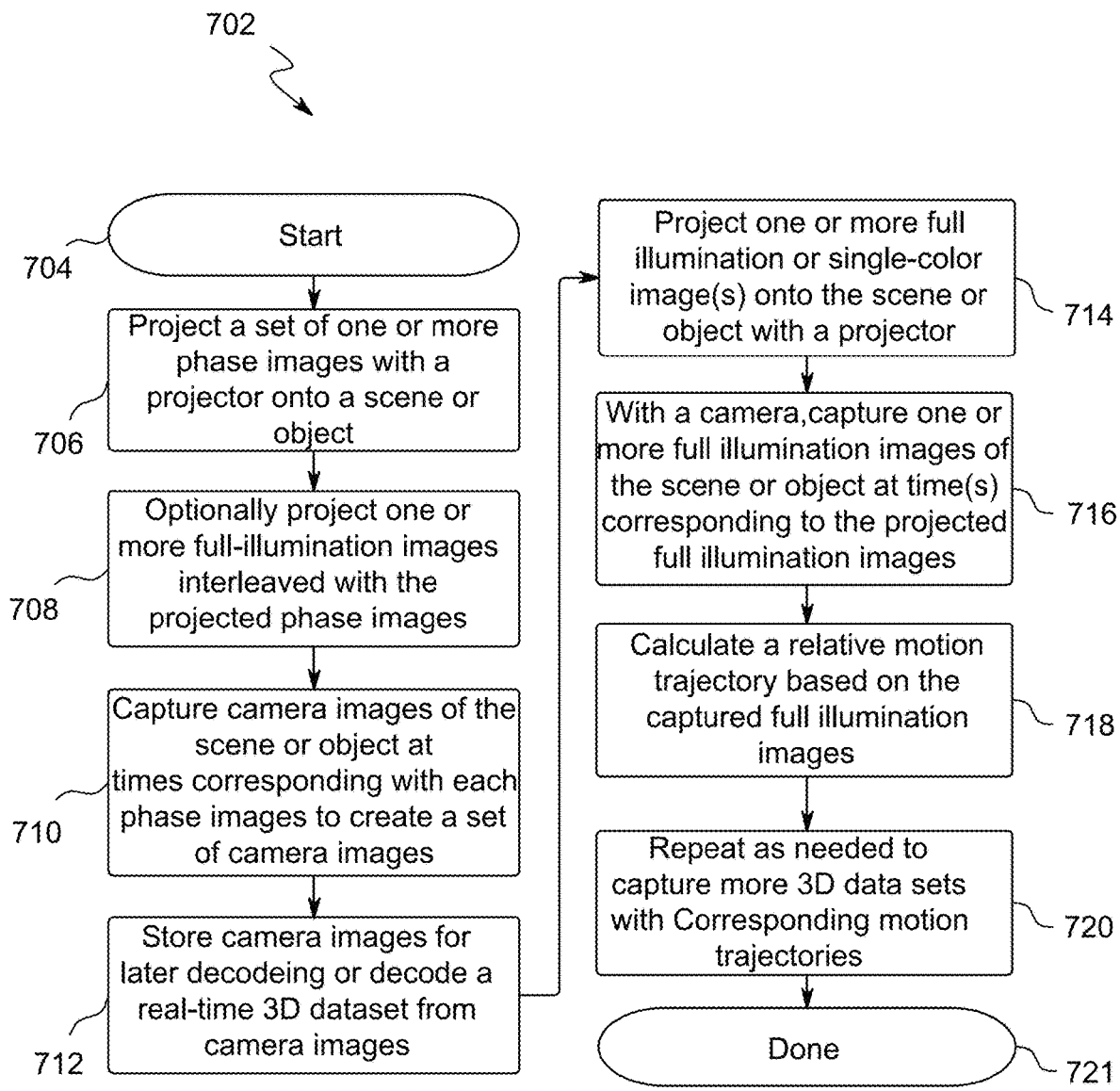
FIG. 7 is a flow chart depicting a multi-mode 3D scanning process.

FIG. 7 is a flowchart describing a multi-mode capture sequence or process 702. At block 704, the process starts. At block 706, project a set of one or more phase images with a projector onto a scene or object. Phase images projected at block 706 may be for the phase images of FIGS. 3D-3U with spatial frequencies between 1 and 200 periods per image width, or they may be a universal phase image created according to FIGS. 5A, 5B and 6A-6E with multiple embedded frequencies above 40 periods per image width. At block 708, optionally project one or more full-illumination images interleaved with the projected phase images. At block 710, capture camera images of the scene or object at times corresponding with each phase image to create a set of camera images. At block 712, store camera images for later decoding or decode a real-time 3D dataset from camera images. At block, project one or more full illumination or single-color image(s) onto the scene or object with a projector. At block 716, with a camera (e.g., sensor), capture one or more full illumination mages of the scene or object at time(s) corresponding to the projected full illumination images. At block 718, calculate a relative motion trajectory and/or orientation difference based on the captured full illumination images. At block, 720 repeat steps 706-718 as needed to capture more 3D data sets with corresponding motion trajectories. At block, 722 the process is done.

The process shown in FIG. 7 may be a solution to two technological problems: One technological problem is that individual 3D data sets captured as part of 3D scanning processes with 3D scanning hardware may be mis-aligned or difficult to align correctly and a resulting unified 3D data set may contain some data that does not accurately represent the shape of the object being scanned. This may result in components manufactured from these 3D datasets being rejected, not fitting properly or not meeting required tolerances. The process shown in FIG. 7 may solve this by providing motion trajectories or orientation differences with times (e.g. timestamps) corresponding to respective 3D data sets which may be used to correctly align the 3D datasets to create a unified 3D data set in which all data correctly represents the object being scanned and no data is misaligned. A second technological problem is that humans may have adverse reactions such as nausea, headache and or visual distress when performing scanning processes that project rapid sequences zebra stripe images (e.g. phase images). The process of FIG. 7 may reduce or eliminate human adverse reactions by providing interleaved full-illumination frames resulting in the appearance of a more-constant or less "strobe-like" overall illumination experience for the user.

Figure 8:
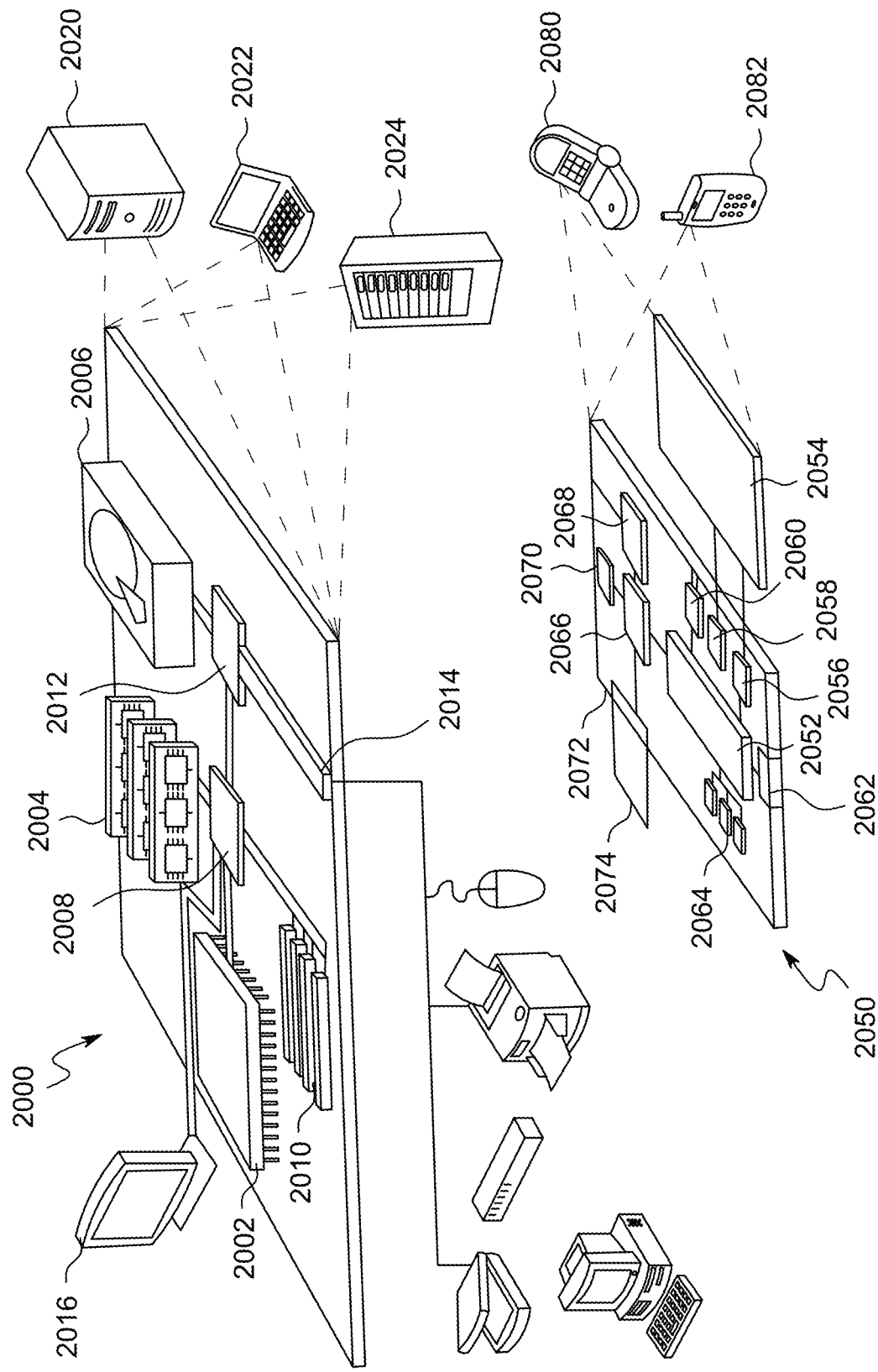
FIG. 8 is a block diagram of computing devices that may be used to implement the one or more systems or methods according to one or more aspects of the disclosure.

FIG. 8 is a block diagram of computing devices 2000, 2050 that may be used to implement the systems and methods described in this document, as either a client or as a server or plurality of servers. Computing device 2000 is intended to represent various forms of digital computers, such as laptops, desktops, workstations, personal digital assistants, servers, blade servers, mainframes, and other appropriate computers. Computing device 2050 is intended to represent various forms of mobile devices, such as personal digital assistants, cellular telephones, smartphones, and other similar computing devices. Additionally, computing device 2000 or 2050 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 2000 includes a processor 2002, memory 2004, a storage device 2006, a high-speed interface 2008 connecting to memory 2004 and high speed expansion ports 2010, and a low speed interface 2012 connecting to low speed bus 2014 and storage device 2006. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing portions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high-speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high speed expansion ports 2010, which may accept various expansion cards (not shown). In the implementation, low speed controller 2012 is coupled to storage device 2006 and low speed expansion port 2014. The low speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing device 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. Additionally, the processor may be implemented using any of a number of architectures. For example, the processor 2002 may be a FPGA, ASIC, CISC (Complex Instruction Set Computers) processor, a RISC (Reduced Instruction Set Computer) processor, or a MISC (Minimal Instruction Set Computer) processor. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT (Thin-Film-Transistor Liquid Crystal Display) display or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provided in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a non-transitory computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provided as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052 that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, WiFi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smartphone 2082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

This document describes technologies that can be applied to a wide range of uses, which are designed and intended to be beneficial for all users involved. However, some of the technologies described may be put to illegitimate, malicious, and even illegal ends by bad actors. This is true with almost any technology, but there is often a greater sensitivity when a technology interacts with a user's security and private information. The described technologies all are designed to operate in an environment and in a manner that respects the rights of all users. As such, features such as user notification, opt-in and opt-out procedures, and privacy settings are available options to be used to ensure user security and privacy are respected.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. As used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A system for capturing 3D representations from an object, comprising:
    a light source being configured to project a sequence of one or more light patterns, at least one of the light patterns is a phase-encoded pattern containing a non-repeating pattern of gradients between each pixel and adjacent pixels, whereby the light source can project the phase-encoded pattern onto a scene;
    a light sensor configured to capture at least one image of the scene under the influence of the projected pattern; and
    a processor configured to decode gradients in the captured image to determine the coordinates in the projected image that created the light received at each captured image pixel.

2. The system of claim 1 wherein the non-repeating pattern has signs of the gradients between each pixel and adjacent pixels form a non-repeating pattern.

3. The system of claim 1 wherein subsets of gradients between pixels and their adjacent pixels form more than one code per pixel that each can be decoded to yield phase values.

4. The system of claim 3 wherein pixel phase values are recorded as valid only if more than one code decodes to the same phase value.

5. The system of claim 3 wherein a confidence score is calculated for the decoded phase value assigned to a captured image pixel based on the number of decoded codes that agree on the phase value.

6. The system of claim 1 wherein the gradients between pixels and their adjacent pixels are interpreted as binary or ternary numbers which are used as the basis of a phase-decoding process.

7. A method for capturing 3D representations from an object, comprising:
    projecting a sequence of one or more light patterns, at least one of the light patterns is a phase-encoded pattern containing a non-repeating pattern of gradients between each pixel and adjacent pixels, whereby the light source can project the phase-encoded pattern onto a scene;
    capturing at least one image of the scene under the influence of the projected pattern; and
    decoding gradients in the captured image to determine the coordinates in the projected image that created the light received at each captured image pixel.

8. The method of claim 7 wherein the non-repeating pattern has signs of the gradients between each pixel and adjacent pixels form a non-repeating pattern.

9. The method of claim 7 wherein subsets of gradients between pixels and their adjacent pixels form more than one code per pixel that each can be decoded to yield phase values.

10. The method of claim 9 wherein pixel phase values are recorded as valid only if more than one code decodes to the same phase value.

11. The method of claim 9 wherein a confidence score is calculated for the decoded phase value assigned to a captured image pixel based on the number of decoded codes that agree on the phase value.

12. The method of claim 7 wherein the gradients between pixels and their adjacent pixels are interpreted as binary or ternary numbers which are used as the basis of a phase-decoding process.

13. At least one non-transitory computer readable medium storing instructions that, when executed by one or more processors, cause the one or more processors to:
    project a sequence of one or more light patterns, at least one of the light patterns is a phase-encoded pattern containing a non-repeating pattern of gradients between each pixel and adjacent pixels, whereby the light source can project the phase-encoded pattern onto a scene;
    capture at least one image of the scene under the influence of the projected pattern; and
    decode gradients in the captured image to determine the coordinates in the projected image that created the light received at each captured image pixel.

14. The non-transitory computer readable medium of claim 13 wherein the non-repeating pattern has signs of the gradients between each pixel and adjacent pixels form a non-repeating pattern.

15. The non-transitory computer readable medium of claim 13 wherein subsets of gradients between pixels and their adjacent pixels form more than one code per pixel that each can be decoded to yield phase values.

16. The non-transitory computer readable medium of claim 15 wherein pixel phase values are recorded as valid only if more than one code decodes to the same phase value.

17. The non-transitory computer readable medium of claim 15 wherein a confidence score is calculated for the decoded phase value assigned to a captured image pixel based on the number of decoded codes that agree on the phase value.

18. The non-transitory computer readable medium of claim 13 wherein the gradients between pixels and their adjacent pixels are interpreted as binary or ternary numbers which are used as the basis of a phase-decoding process.

* * * * *